United States Patent
Agiwal et al.

(10) Patent No.: US 12,035,274 B2
(45) Date of Patent: Jul. 9, 2024

(54) METHOD AND APPARATUS FOR PAGING AND SYSTEM INFORMATION (SI) UPDATE TRANSMISSION AND RECEPTION

(71) Applicant: Samsung Electronics Co., Ltd., Suwon-si (KR)

(72) Inventors: Anil Agiwal, Suwon-si (KR); Soenghun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 281 days.

(21) Appl. No.: 17/223,387

(22) Filed: Apr. 6, 2021

(65) Prior Publication Data

US 2021/0314909 A1 Oct. 7, 2021

Related U.S. Application Data

(60) Provisional application No. 63/005,753, filed on Apr. 6, 2020.

(51) Int. Cl.
*H04W 68/00* (2009.01)
*H04W 72/23* (2023.01)
*H04W 76/28* (2018.01)

(52) U.S. Cl.
CPC ......... *H04W 68/005* (2013.01); *H04W 72/23* (2023.01); *H04W 76/28* (2018.02)

(58) Field of Classification Search
CPC . H04W 68/02; H04W 72/042; H04W 68/005; H04W 16/14; H04B 1/713; H04L 5/0023; H04L 5/0012; H04L 5/0053
See application file for complete search history.

(56) References Cited

U.S. PATENT DOCUMENTS

| 11,012,974 B2 | 5/2021 | Murray et al. |
| 11,229,003 B2 * | 1/2022 | Shih ...................... H04W 76/11 |

(Continued)

FOREIGN PATENT DOCUMENTS

| CN | 106162842 A * 11/2016 |
| EP | 3 473 043 A1    4/2019 |

(Continued)

OTHER PUBLICATIONS

Qualcomm Inc., 'Enhancements to I-DRX procedure', R2-1906702, 3GPP TSG-RAN WG2 Meeting #106, Reno, USA, May 3, 2019, section 2.

(Continued)

*Primary Examiner* — Ayaz R Sheikh
*Assistant Examiner* — Tarell A Hampton
(74) *Attorney, Agent, or Firm* — Jefferson IP Law, LLP

(57) ABSTRACT

A communication method and system for converging a $5^{th}$ generation (5G) communication system for supporting higher data rates beyond a $4^{th}$ generation (4G) system with a technology for Internet of things (IoT) are provided. The communication method and system include intelligent services based on the 5G communication technology and the IoT-related technology, such as smart home, smart building, smart city, smart car, connected car, health care, digital education, smart retail, security and safety services. A method, a terminal, and a base station for paging and SI update transmission and reception in a wireless communication system are provided. The method includes receiving, from a base station, information on a default discontinuous reception (DRX) cycle, identifying a UE specific DRX cycle, identifying whether an indicator indicating that the UE monitors a paging occasion (PO) based on the UE specific DRX cycle is configured, identifying whether the UE specific DRX cycle is greater than the default DRX (Continued)

cycle, identifying a first paging frame (PF) for monitoring a paging message and a second PF for monitoring a short message in case that the indicator is configured and the UE specific DRX cycle is greater than the default DRX cycle, identifying a first PO corresponding to the first PF and a second PO corresponding to the second PF, and monitoring a physical downlink control channel (PDCCH) addressed to a paging-radio network temporary identity (P-RNTI) in the identified first and second POs.

16 Claims, 16 Drawing Sheets

(56) References Cited

U.S. PATENT DOCUMENTS

| | | | |
|---|---|---|---|
| 2015/0341978 A1* | 11/2015 | Rune | H04W 48/12 370/254 |
| 2017/0367069 A1 | 12/2017 | Agiwal et al. | |
| 2018/0234917 A1 | 8/2018 | Kim et al. | |
| 2019/0174449 A1* | 6/2019 | Shan | H04W 60/00 |
| 2019/0349902 A1 | 11/2019 | Soriaga et al. | |
| 2019/0373581 A1 | 12/2019 | Ryu et al. | |
| 2020/0053791 A1* | 2/2020 | Ozturk | H04W 76/11 |
| 2020/0084747 A1* | 3/2020 | Hong | H04W 72/23 |
| 2020/0329455 A1* | 10/2020 | Ryu | H04W 68/02 |
| 2020/0351821 A1* | 11/2020 | Wang | H04W 52/0277 |
| 2021/0168738 A1* | 6/2021 | Shih | H04W 68/02 |
| 2021/0250898 A1* | 8/2021 | Abedini | H04W 48/12 |
| 2021/0274465 A1 | 9/2021 | Huang et al. | |
| 2022/0015146 A1* | 1/2022 | Rune | H04B 7/0695 |
| 2022/0039009 A1* | 2/2022 | Iyer | H04L 5/0098 |

FOREIGN PATENT DOCUMENTS

| | | | |
|---|---|---|---|
| EP | 3890412 A1 * | 10/2021 | |
| KR | 20200028822 A * | 3/2020 | |
| WO | 2017/051502 A1 | 3/2017 | |
| WO | 2018/144873 A1 | 8/2018 | |
| WO | WO-2019063819 A1 * | 4/2019 | |
| WO | WO-2019109309 A1 * | 6/2019 | |
| WO | 2020/033648 A1 | 2/2020 | |
| WO | WO-2020068290 A1 * | 4/2020 | |
| WO | WO-2021062822 A1 * | 4/2021 | H04W 68/005 |
| WO | WO-2021231543 A1 * | 11/2021 | |

OTHER PUBLICATIONS

Ericsson, 'DRX cycle in Idle and Inactive mode', R2-1906603, 3GPP TSG-RAN2 Meeting #106, Reno, USA, May 3, 2019, section 2.
International Search Report dated Jul. 13, 2021, issued in International Patent Application No. PCT/KR2021/004288.
Samsung, Paging Enhancements: DRX cycle for monitoring paging, R2-2102705, 3GPP TSG-RAN2 Meeting, #113bis Electronic, Apr. 1, 2021.
Apple, I-DRX Enhancement, R2-1903605, 3GPP TSG-RAN WG2 Meeting #105bis, Xi'an, China, Apr. 6, 2019.
3GPP TS 38.304 V16.0.0, 3rd Generation Partnership Project; Technical Specification Group Radio Access Network; NR; User Equipment (UE) procedures in Idle mode and RRC, Inactive state, (Release 16), Apr. 5, 2020.
3GPP TS 38.300 V15.9.0, 3rd Generation Partnership Project; Technical Specification Group Radio Access Network; NR; NR and NG-RAN Overall Description; Stage 2, (Release 15), Apr. 4, 2020.
3GPP TS 38.331 V16.0.0, 3rd Generation Partnership Project; Technical Specification Group Radio Access Network; NR; Radio Resource Control (RRC) protocol specification, (Release 16), Apr. 5, 2020.
Extended European Search Report dated Jul. 17, 2023, issued in European Patent Application No. 21783721.0.

* cited by examiner

METHOD AND APPARATUS FOR PAGING AND SYSTEM INFORMATION (SI) UPDATE TRANSMISSION AND RECEPTION

CROSS-REFERENCE TO RELATED APPLICATION(S)

This application is based on and claims priority under 35 U.S.C. § 119(e) of a U.S. Provisional application Ser. No. 63/005,753, filed on Apr. 6, 2020, in the U.S. Patent and Trademark Office, the disclosure of which is incorporated by reference herein in its entirety.

BACKGROUND

1. Field

The disclosure relates to a method for paging and system information (SI) update transmission and reception. More particularly, the disclosure relates to a method, a terminal, and a base station for paging and SI update transmission and reception in a wireless communication system.

2. Description of Related Art

To meet the demand for wireless data traffic which has increased since deployment of 4th generation (4G) communication systems, efforts have been made to develop an improved 5th generation (5G) or pre-5G communication system. Therefore, the 5G or pre-5G communication system is also referred to as a 'beyond 4G network' or a 'post long-term evolution (LTE) System.' The 5G wireless communication system supports not only lower frequency bands, but also higher frequency (millimeter (mm) Wave) bands, e.g., 10 gigahertz (GHz) to 100 GHz bands, so as to accomplish higher data rates. To mitigate propagation loss of the radio waves and increase the transmission distance, beamforming, massive multiple-input multiple-output (MIMO), full dimensional MIMO (FD-MIMO), array antenna, analog beam forming, and large-scale antenna techniques are being considered in the design of the 5G wireless communication system. In addition, in 5G communication systems, development for system network improvement is underway based on advanced small cells, cloud radio access networks (RANs), ultra-dense networks, device-to-device (D2D) communication, wireless backhaul, moving network, cooperative communication, coordinated multi-points (COMP), reception-end interference cancellation, and the like. In the 5G system, frequency and quadrature amplitude modulation (FQAM), which is a combination of hybrid frequency shift keying (FSK) and quadrature amplitude modulation (QAM), and sliding window superposition coding (SWSC) as an advanced coding modulation (ACM), filter bank multi-carrier (FBMC), non-orthogonal multiple access (NOMA), and sparse code multiple access (SCMA) as an advanced access technology, have been also developed.

In a similar regard, the Internet, which is a human centered connectivity network where humans generate and consume information, is now evolving into an internet of things (IoT) where distributed entities, such as things, exchange and process information without human intervention. The internet of everything (IoE), which is a combination of IoT technology and big data processing technology through connection with a cloud server, has also emerged. As technology elements, such as "sensing technology," "wired/wireless communication and network infrastructure," "service interface technology," and "security technology" have been demanded for IoT implementation, a sensor network, a machine-to-machine (M2M) communication, machine-type communication (MTC), and so forth, have been recently researched. Such an IoT environment may provide intelligent Internet technology services that create new value to human life by collecting and analyzing data generated among connected things. In this case, IoT may be applied to a variety of fields including a smart home, a smart building, a smart city, a smart car or connected cars, a smart grid, health care, smart appliances, and advanced medical services through convergence and combination between existing information technology (IT) and various industrial applications.

In line with this, various attempts have been made to apply 5G communication systems to IoT networks. For example, technologies, such as a sensor network, MTC, and M2M communication may be implemented by beamforming, MIMO, and array antennas. Application of a cloud RAN as the above-described big data processing technology may also be considered to be an example of convergence between the 5G technology and the IoT technology.

In recent years, several broadband wireless technologies have been developed to meet the growing number of broadband subscribers and to provide more and better applications and services such as these. The second generation (2G) wireless communication system has been developed to provide voice services while ensuring the mobility of users. The third generation (3G) wireless communication system supports the voice service and data service. The 4G wireless communication system has been developed to provide high-speed data service. However, the 4G wireless communication system currently suffers from a lack of resources to meet the growing demand for high speed data services. Therefore, the 5G wireless communication system (also referred as next generation radio or new radio (NR)) is being developed to meet the growing demand of various services with diverse requirements, e.g., high-speed data services, support ultra-reliability and low-latency applications.

In addition, the 5G wireless communication system is expected to address different use cases having different requirements in terms of data rate, latency, reliability, mobility, etc. However, it is expected that the design of the air-interface of the 5G wireless communication system will be flexible enough to serve user equipments (UEs) having different capabilities depending on the use case and market segment in which a UE caters service to the end customer. Use cases that the 5G wireless communication system is expected to address include enhanced mobile broadband (eMBB), massive machine type communication (m-MTC), ultra-reliable low-latency communication (URLL), etc. The eMBB requirements (e.g., tens of gigabits per second (Gbps) data rate, low-latency, high-mobility, and so on) address the market segment representing the wireless broadband subscribers needing internet connectivity everywhere, all the time, and on the go. The m-MTC requirements (e.g., very high connection density, infrequent data transmission, very long battery life, low mobility address, and so on) address the market segment representing the loT/IoE envisioning connectivity of billions of devices. The URLL requirements (e.g., very low latency, very high reliability, variable mobility, and so forth) address the market segment representing the industrial automation application and vehicle-to-vehicle/vehicle-to-infrastructure communication that is foreseen as one of the enablers for autonomous cars.

In the 5G wireless communication system, a next generation node B (gNB) or base station in cell broadcast synchronization signal and physical broadcast channel (PBCH) block (SSB) consists of primary and secondary synchronization signals (PSS, SSS) and system information (SI). SI includes common parameters needed to communicate in a cell. In the 5G wireless communication system (also referred to as next generation radio or NR), SI is divided into the master information block (MIB) and a number of SI blocks (SIBs) where the MIB is always transmitted on the PBCH with a periodicity of 80 ms and repetitions made within 80 ms, and it includes parameters that are needed to acquire SIB1 from the cell, the SIB1 is transmitted on the downlink shared channel (DL-SCH) with a periodicity of 160 ms and variable transmission repetition. The default transmission repetition periodicity of SIB1 is 20 ms, but the actual transmission repetition periodicity is up to network implementation. SIB1 includes information regarding the availability and scheduling (e.g., mapping of SIBs to SI message, periodicity, and SI-window size) of other SIBs with an indication whether one or more SIBs are only provided on-demand and, in that case, the configuration needed by the UE to perform the SI request. SIB1 is cell-specific SIB, and SIBs other than SIB1 are carried in SystemInformation (SI) messages, which are transmitted on the DL-SCH. Only SIBs having the same periodicity can be mapped to the same SI message.

In the 5G wireless communication system, a list of search space configurations is signaled by a gNB for each configured bandwidth part (BWP), wherein each search configuration is uniquely identified by an identifier (ID). An ID of a search space configuration to be used for specific purpose such as paging reception, SI reception, and random access response reception is explicitly signaled by the gNB. In NR, a search space configuration comprises parameters Monitoring-periodicity-PDCCH-slot, Monitoring-offset-PDCCH-slot, Monitoring-symbols-PDCCH-within-slot, and duration. A UE determines physical downlink control channel (PDCCH) monitoring occasion(s) within a slot using the parameters PDCCH monitoring periodicity (Monitoring-periodicity-PDCCH-slot), the PDCCH monitoring offset (Monitoring-offset-PDCCH-slot), and the PDCCH monitoring pattern (Monitoring-symbols-PDCCH-within-slot). PDCCH monitoring occasions are there in slots 'x' to x+duration, where the slot with number 'x' in a radio frame with number 'y' satisfies the following equation.

$$(y*(\text{number of slots in a radio frame})+x-\text{Monitoring-offset-PDCCH-slot}) \bmod (\text{Monitoring-periodicity-PDCCH-slot})=0 \quad \text{Equation 1}$$

The starting symbol of a PDCCH monitoring occasion in each slot having PDCCH monitoring occasion is given by Monitoring-symbols-PDCCH-within-slot. The length (in symbols) of a PDCCH monitoring occasion is given in the control resource set (CORESET) associated with the search space. Search space configuration includes the ID of CORESET configuration associated with it. A list of CORESET configurations is signaled by a gNB for each configured BWP, wherein each CORESET configuration is uniquely identified by an ID. Note that each radio frame is of 10 ms duration. A radio frame is identified by a radio frame number or system frame number. Each radio frame comprises several slots, wherein the number of slots in a radio frame and duration of slots depend on subcarrier spacing (SCS). The number of slots in a radio frame and duration of slots depending on radio frame for each supported SCS are pre-defined in NR. Each CORESET configuration is associated with a list of transmission configuration indicator (TCI) states. One DL reference signal (RS) ID (SSB or channel state information (CSI)-RS) is configured per TCI state. The list of TCI states corresponding to a CORESET configuration is signaled by a gNB via radio resource control (RRC) signaling. One of the TCI states in a TCI state list is activated and indicated to the UE by the gNB. The TCI state indicates the DL transmission (TX) beam (DL TX beam is quasi co-located (QCLed) with SSB/CSI-RS of TCI state) used by the gNB for transmission of PDCCH in the PDCCH monitoring occasions of a search space.

In the 5G wireless communication system, the UE can be in one of the following RRC state: RRC_IDLE, RRC_INACTIVE and RRC_CONNECTED. The RRC states can further be characterized as follows:

In RRC_IDLE state, a UE specific discontinuous reception (DRX) may be configured by upper layers (i.e., non-access stratum (NAS)). The UE monitors short messages transmitted with paging-radio network temporary identity (P-RNTI) over downlink control information (DCI), monitors a paging channel for core network (CN) paging using 5G-system architecture evolution (SAE)-temporary mobile subscriber identity (5G-S-TMSI), performs neighboring cell measurements and cell selection or re-selection, acquires SI, and can send SI request (if configured).

In RRC_INACTIVE state, a UE specific DRX may be configured by upper layers or by RRC layer. In this state, the UE stores the UE inactive access stratum (AS) context. A radio access network (RAN)-based notification area is configured by RRC layer. The UE monitors short messages transmitted with P-RNTI over DCI, monitors a paging channel for CN paging using 5G-S-TMSI and RAN paging using full inactive-RNTI (I-RNTI), performs neighboring cell measurements and cell selection or re-selection, performs RAN-based notification area updates periodically and when moving outside the configured RAN-based notification area, acquires SI, and can send SI request (if configured).

In the RRC_CONNECTED, the UE stores the AS context. Unicast data is transmitted/received to/from the UE. At lower layers, the UE may be configured with a UE specific DRX. The UE monitors short messages transmitted with P-RNTI over DCI, if configured, monitors control channels associated with the shared data channel to determine if data is scheduled for it, provides channel quality and feedback information, performs neighboring cell measurements and measurement reporting, and acquires SI.

The 5G or NG-RAN based on NR consists NG-RAN nodes where NG-RAN node is a gNB, providing NR user plane and control plane protocol terminations towards the UE. The gNBs are also connected by means of the NG interfaces to the 5G core network (5GC), more specifically to the access and mobility management function (AMF) by means of the NG-control (NG-C) interface and to the user plane function (UPF) by means of the NG-user (NG-U) interface. In the 5G wireless communication system, the UE may use DRX in RRC_IDLE and RRC_INACTIVE states in order to reduce power consumption. In the RRC_IDLE/RRC_INACTIVE states, the UE wakes up at regular intervals (i.e., every DRX cycle) for short periods to receive paging, to receive SI update notification and to receive emergency notifications. A paging message is transmitted using physical downlink shared channel (PDSCH). A physical downlink common control channel (PDCCH) is addressed to the P-RNTI if there is a paging message in PDSCH. P-RNTI is common for all UEs. A UE identity (i.e., S-TMSI for RRC_IDLE UE or I-RNTI for RRC_INACTIVE UE) is included in paging message to indicate paging for a specific UE. The paging message may include multiple UE identities to page multiple UEs. The paging message is broadcasted (i.e., PDCCH is masked with P-RNTI) over data channel (i.e., PDSCH). The SI update and emergency notifications are included in DCI and PDCCH carrying this DCI is addressed to the P-RNTI. In the RRC idle/inactive mode, the UE monitors one paging occasion (PO) every DRX cycle. In the RRC idle/inactive mode, the UE monitors the PO in initial DL BWP. In RRC connected state, the UE monitors one or more POs to receive the SI update notification and to receive emergency notifications. The UE can monitor any PO in paging DRX cycle and monitors at least one PO in SI modification period. In the RRC idle/inactive mode, the UE monitors the PO in its active DL BWP. A PO is a set of 'S' PDCCH monitoring occasions for paging, where 'S' is the number of transmitted SSBs (i.e., the SSB consists PSS, SSS and PBCH) in cell. The UE first determines the paging frame (PF) and then determines the PO with respect to the determined PF. One PF is a radio frame (10 ms).

The PF for a UE is the radio frame with system frame number 'SFN' which satisfies the following equation.

(SFN+PF_offset)mod $T$=($T$ div $N$)*(UE_ID mod $N$)  Equation 2

Index (i_s) indicating the index of the PO is determined by i_s=floor (UE_ID/N) mod Ns.

T is DRX cycle of the UE. In RRC_INACTIVE state, T is determined by the shortest of the UE specific DRX value configured by RRC, a UE specific DRX value configured by NAS, and a default DRX value broadcast in SI. In RRC_IDLE state, T is determined by the shortest of a UE specific DRX value configured by NAS and a default DRX value broadcast in SI. If the UE specific DRX is not configured by upper layers (i.e., NAS), the default value is applied.

N is the number of total PFs in T.

Ns is the number of POs for a PF.

PF_offset is the offset used for PF determination.

UE_ID is 5G-S-TMSI mod 1024.

Parameters Ns, nAndPagingFrameOffset, and the length of default DRX cycle are signaled in SIB1. The values of N and PF_offset are derived from the parameter nAndPagingFrameOffset as defined in technical specification (TS) 38.331. If the UE has no 5G-S-TMSI, for instance when the UE has not yet registered onto the network, the UE shall use as default identity UE_ID=0 in the PF and i_s formulas above.

The PDCCH monitoring occasions for paging are determined based on paging search space configuration (paging-SearchSpace) signaled by gNB.

When SearchSpaceId=0 is configured for paging-SearchSpace, the PDCCH monitoring occasions for paging are the same as for the remaining minimum SI (RMSI). When SearchSpaceId=0 is configured for paging-SearchSpace, Ns is either 1 or 2. For Ns=1, there is only one PO which starts from the first PDCCH monitoring occasion for paging in the PF. For Ns=2, PO is either in the first half frame (i_s=0) or the second half frame (i_s=1) of the PF.

When SearchSpaceId other than 0 is configured for pagingSearchSpace, the UE monitors the (i_s+1)th PO. The PDCCH monitoring occasions for paging are determined based on a paging search space configuration (paging-SearchSpace) signaled by gNB. The PDCCH monitoring occasions for paging which are not overlapping with uplink (UL) symbols (determined according to tdd-UL-DL-ConfigurationCommon) are sequentially numbered from zero starting from the first PDCCH monitoring occasion for paging in the PF. The gNB may signal parameter firstPDCCH-MonitoringOccasionOfPO for each PO corresponding to a PF. When firstPDCCH-MonitoringOccasionOfPO is signaled, the (i_s+1)th PO is a set of 'S' consecutive PDCCH monitoring occasions for paging starting from the PDCCH monitoring occasion number indicated by firstPDCCH-MonitoringOccasionOfPO (i.e., the (i_s+1)th value of the firstPDCCH-MonitoringOccasionOfPO parameter). Otherwise, the (i_s+1)th PO is a set of 'S' consecutive PDCCH monitoring occasions for paging starting from the (i_s*S)th PDCCH monitoring occasion for paging. 'S' is the number of actual transmitted SSBs determined according to parameter ssb-PositionsInBurst signaled in SystemInformationBlock1 received from the gNB. The parameter firstPDCCH-MonitoringOccasionOfPO is signaled in SIB1 for paging in an initial DL BWP. For paging in a DL BWP other than the initial DL BWP, the parameter first-PDCCH-MonitoringOccasionOfPO is signaled in the corresponding BWP configuration.

The PDCCH addressed to the P-RNTI carries information according to DCI format 1_0. The following information is transmitted by means of the DCI format 1_0 with cyclic redundancy check (CRC) scrambled by P-RNTI:

Short Messages Indicator—2 bits according to Table 1.

Short Messages—8 bits according to Table 2. If only the scheduling information for paging is carried, this bit field is reserved.

Frequency domain resource assignment—$\lceil \log_2 (N_{RB}^{DL,BWP}(N_{RB}^{DL,BWP}+1)/2) \rceil$ bits. If only the short message is carried, this bit field is reserved. $N_{RB}^{DL,BWP}$ is the size of CORESET 0.

Time domain resource assignment—4 bits. If only the short message is carried, this bit field is reserved.

VRB-to-PRB mapping—1 bit. If only the short message is carried, this bit field is reserved.

Modulation and coding scheme—5 bits. If only the short message is carried, this bit field is reserved.

TB scaling—2 bits. If only the short message is carried, this bit field is reserved.

Reserved bits—6 bits.

TABLE 1

| Bit field | Short Message indicator |
| --- | --- |
| 00 | Reserved |
| 01 | Only scheduling information for Paging is present in the DCI |
| 10 | Only short message is present in the DCI |
| 11 | Both scheduling information for Paging and short message are present in the DCI |

Table 2 defines short message. Bit 1 is the most significant bit.

TABLE 2

| | Short Message |
| --- | --- |
| Bit | Short Message |
| 1 | systemInfoModification<br>If set to 1: indication of a BCCH modification other than SIB6, SIB7 and SIB8. |
| 2 | etwsAndCmasIndication<br>If set to 1: indication of an ETWS primary notification and/or an ETWS secondary notification and/or a CMAS notification. |
| 3-8 | Reserved |

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a communication method and system for converging a 5th generation (5G) communication system for supporting higher data rates beyond a 4th generation (4G) system.

In accordance with an aspect of the disclosure, a method performed by a user equipment (UE) in a wireless communication system is provided. The method includes receiving, from a base station, information on a default discontinuous reception (DRX) cycle, identifying a UE specific DRX cycle, identifying whether an indicator indicating that the UE monitors a paging occasion (PO) based on the UE specific DRX cycle is configured, identifying whether the UE specific DRX cycle is greater than the default DRX cycle, identifying a first paging frame (PF) for monitoring a paging message and a second PF for monitoring a short message in case that the indicator is configured and the UE specific DRX cycle is greater than the default DRX cycle, identifying a first PO corresponding to the first PF and a second PO corresponding to the second PF, and monitoring a physical downlink control channel (PDCCH) addressed to a paging-radio network temporary identity (P-RNTI) in the identified first and second POs.

In accordance with another aspect of the disclosure, a method performed by a base station in a wireless communication system is provided. The method includes transmitting, to a UE, information on a DRX cycle, receiving, from an AMF, information on a UE specific DRX cycle, identifying whether an indicator indicating that the UE monitors a PO based on the UE specific DRX cycle is configured, identifying whether the UE specific DRX cycle is greater than the default DRX cycle, identifying a first PF for monitoring a paging message and a second PF for monitoring a short message in case that the indicator is configured and the UE specific DRX cycle is greater than the default DRX cycle, identifying a first PO corresponding to the first PF and a second PO corresponding to the second PF, transmitting, to the UE, the short message on a PDCCH addressed to a P-RNTI in the identified first PO, and transmitting, to the UE, the paging message on the PDCCH addressed to the P-RNTI in the identified second PO.

In accordance with another aspect of the disclosure, a UE in a wireless communication system is provided. The UE includes a transceiver and at least one processor coupled with the transceiver. The at least one processor is configured to receive, from a base station via the transceiver, information on a DRX cycle, identify a UE specific DRX cycle, identify whether an indicator indicating that the UE monitors a PO based on the UE specific DRX cycle is configured, identify whether the UE specific DRX cycle is greater than the default DRX cycle, identify a first PF for monitoring a paging message and a second PF for monitoring a short message in case that the indicator is configured and the UE specific DRX cycle is greater than the default DRX cycle, identify a first PO corresponding to the first PF and a second PO corresponding to the second PF, and monitor a PDCCH addressed to a P-RNTI in the identified first and second POs.

In accordance with another aspect of the disclosure, a base station in a wireless communication system is provided. The base station includes a transceiver and at least one processor coupled with the transceiver. The at least one processor is configured to transmit, to a UE via the transceiver, information on a default DRX cycle, receive, from an AMF via the transceiver, information on a UE specific DRX cycle, identify whether an indicator indicating that the UE monitors a PO based on the UE specific DRX cycle is configured, identify whether the UE specific DRX cycle is greater than the default DRX cycle, identify a first PF for monitoring a paging message and a second PF for monitoring a short message in case that the indicator is configured and the UE specific DRX cycle is greater than the default DRX cycle, identify a first PO corresponding to the first PF and a second PO corresponding to the second PF, transmit, to the UE via the transceiver, the short message on a PDCCH addressed to a P-RNTI in the identified first PO, and transmit, to the UE via the transceiver, the paging message on the PDCCH addressed to the P-RNTI in the identified second PO.

Additional aspects will be set forth in part in the description which follows and, in part, will be apparent from the description, or may be learned by practice of the presented embodiments.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
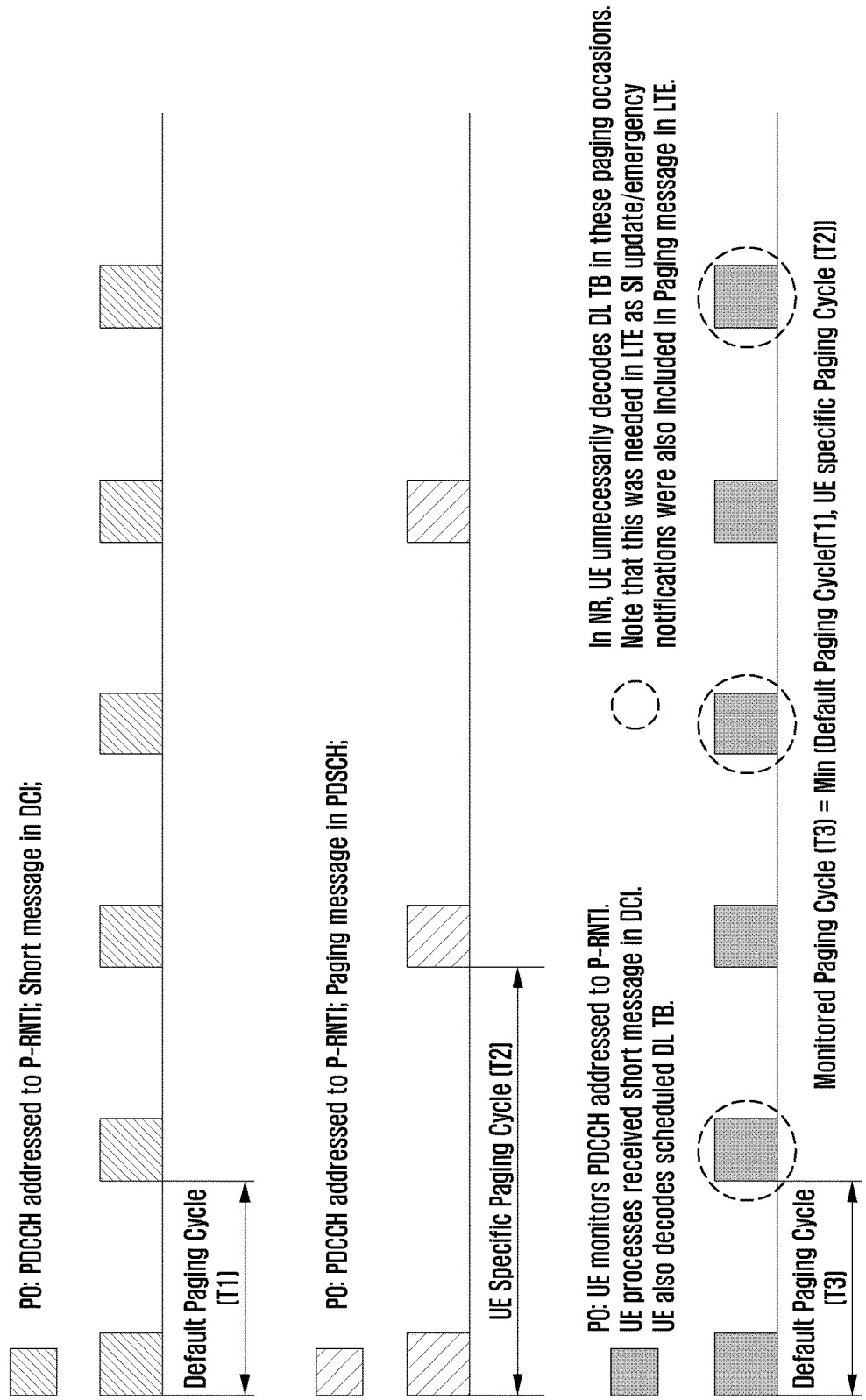
FIG. 1 illustrates various paging cycles configured by a network and monitoring of paging cycle by user equipment (UE) according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect that the characteristic was intended to provide.

It is known to those skilled in the art that blocks of a flowchart (or sequence diagram) and a combination of flowcharts may be represented and executed by non-transitory computer program instructions. These computer program instructions may be loaded on a processor of a general purpose computer, special-purpose computer, or programmable data processing equipment. When the loaded program instructions are executed by the processor, they create a means for carrying out functions described in the flowchart. Because the computer program instructions may be stored in a computer readable memory that is usable in a specialized computer or a programmable data processing equipment, it is also possible to create articles of manufacture that carry out functions described in the flowchart. Because the computer program instructions may be loaded on a computer or a programmable data processing equipment, when executed as processes, they may carry out operations of functions described in the flowchart.

A block of a flowchart may correspond to a module, a segment, or a code containing one or more executable instructions implementing one or more logical functions, or may correspond to a part thereof. In some cases, functions described by blocks may be executed in an order different from the listed order. For example, two blocks listed in sequence may be executed at the same time or executed in reverse order.

In this description, the words "unit," "module," or the like may refer to a software component or hardware component, such as, for example, a field-programmable gate array (FPGA) or an application-specific integrated circuit (ASIC) capable of carrying out a function or an operation. However, a "unit," or the like, is not limited to hardware or software. A unit, or the like, may be configured so as to reside in an addressable storage medium or to drive one or more processors. Units, or the like, may also refer to software components, object-oriented software components, class components, task components, processes, functions, attributes, procedures, subroutines, program code segments, drivers, firmware, microcode, circuits, data, databases, data structures, tables, arrays or variables. A function provided by a component and unit may be a combination of smaller components and units, and may be combined with others to compose larger components and units. Components and units may be configured to drive a device or one or more processors in a secure multimedia card.

Prior to providing the detailed description, terms or definitions necessary to understand the disclosure are described. However, these terms should be construed in a non-limiting way.

A base station (BS) is an entity communicating with a user equipment (UE) and may be referred to as a BS, a base transceiver station (BTS), a node B (NB), an evolved NB (eNB), an access point (AP), a fifth generation (5G) NB (5GNB), or a next generation NB (gNB).

A UE is an entity communicating with a BS and may be referred to as a UE, a device, a mobile station (MS), a mobile equipment (ME), or a terminal.

FIG. 1 illustrates various paging cycles configured by a network and monitoring of paging cycle by a UE according to an embodiment of the disclosure.

Referring to FIG. 1, if the UE specific paging cycle is longer than default paging cycle, the UE may unnecessarily decode a downlink (DL) transport block (TB) for a paging message in several paging occasions (POs) (circled in dotted line in FIG. 1). UE may unnecessarily acquire synchronization signals and physical broadcast channel (PBCH) blocks (SSBs) (up to 3 SSB bursts may need to be acquired) to decode the DL TB for paging message before several POs (circled in dotted line in FIG. 1). Note that this (i.e., decoding DL TB for a paging message in POs circled in dotted line) was needed in long-term evolution (LTE) as system information (SI) update/emergency notifications were also included in paging message in LTE. However, in new radio (NR), SI update/emergency notifications are included in a short message and not in a paging message. Receiving and decoding a DL TB and acquiring additional SSB bursts to decode the DL TB leads to increased wakeup and hence power consumption.

Paging Enhancement for Power Saving in RRC IDLE

Figure 2:
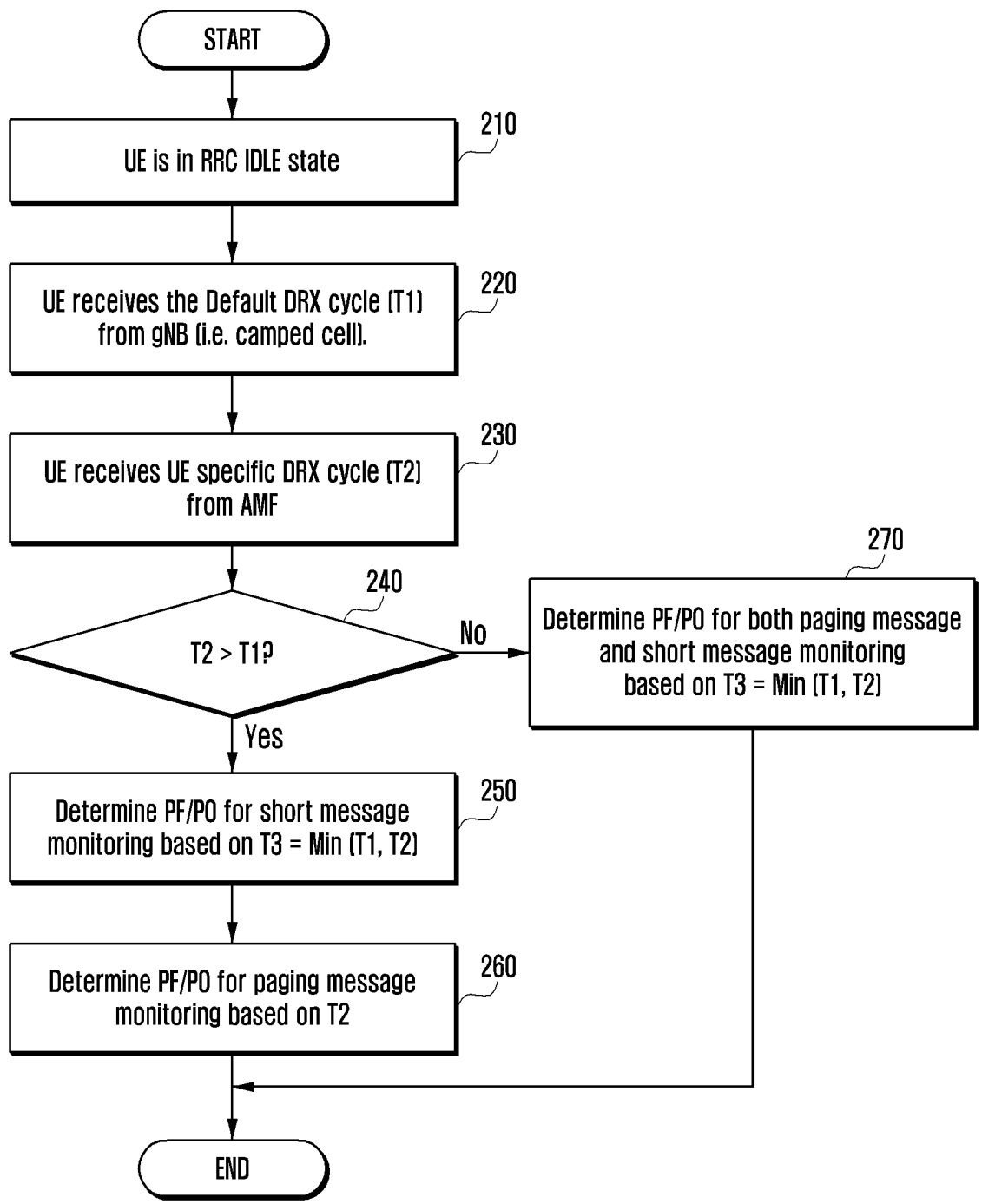
FIG. 2 illustrates a UE operation based on Method 1 according to an embodiment of the disclosure.

Method 1:

FIG. 2 illustrates a UE operation based on Method 1 according to an embodiment of the disclosure.

Referring to FIG. 2, the UE is in a radio resource control (RRC)_IDLE state at operation 210.

The UE receives the default discontinuous reception (DRX) cycle (T1) from the gNB (i.e., camped cell) at operation 220. The default DRX cycle (T1) along with other parameters, i.e., N, Ns and PF_offset is received in paging channel configuration. The paging channel configuration is received in SI (e.g., SystemInformationBlock1) by the UE. The UE also receives paging search space configuration from the gNB. The paging search space configuration is received in SI (e.g., SystemInformationBlock1) by the RRC_IDLE UE.

The UE receives a UE specific DRX cycle (T2) from an upper layer at operation 230. The upper layer receives the same from an access and mobility management function (AMF) or negotiates the same with the AMF.

The UE determines whether the UE specific DRX cycle (T2) is greater than the default DRX cycle (T1) or not at operation 240.

If the UE specific DRX cycle (T2) is greater than the default DRX cycle (T1), the UE determines a paging frame (PF) and a PO for short message monitoring based on a DRX cycle (T3)=Min (default DRX cycle (T1), UE specific DRX cycle (T2)) at operation 250. Specifically, the UE determines the DRX cycle (T3), where T3=Min (default DRX cycle (T1), UE specific DRX cycle (T2)). The UE determines the PF, where the PF is the SFN which satisfies (SFN+PF_offset) mod T3=(T3 div N)*(UE_ID mod N). The UE determines its PO corresponding to the determined PF as explained earlier. In the determined PO, the UE monitors a physical downlink control channel (PDCCH) addressed to paging-radio network temporary identity (P-RNTI) for short message. If downlink control information (DCI) addressed to the P-RNTI includes a short message, the UE processes the received short message. Alternately, for short message monitoring, the UE determines a DRX cycle (T4), where T4=modification period. The modification period is signaled by the gNB in SI block 1 (SIB1). The UE determines the PF, where the PF is the SFN which satisfies (SFN+PF_offset) mod T4=(T4 div N)*(UE_ID mod N). The UE determines its PO corresponding to the determined PF as explained earlier. In the determined PO, the UE monitors the PDCCH addressed to the P-RNTI for the short message. If the DCI addressed to the P-RNTI includes the short message, the UE processes the received short message.

If the UE specific DRX cycle (T2) is greater than the default DRX cycle (T1), the UE determines the PF and the PO for paging message monitoring based on the UE specific DRX cycle (T2) at operation 260. Specifically, the UE determines the PF, where the PF is the SFN which satisfies (SFN+PF_offset) mod T2=(T2 div N)*(UE_ID mod N). The UE determines its PO corresponding to the determined PF as explained earlier. In the determined PO, the UE monitors the PDCCH addressed to the P-RNTI for a paging message. If the DCI addressed to the P-RNTI includes scheduling information for a paging message, the UE decodes the DL TB based on the received scheduling information. In the paging message received in decoded DL TB, the UE checks for its paging identity (e.g., system architecture evolution (SAE)-temporary mobile subscriber identity (S-TMSI)). If the paging message is there for the UE, the gNB includes scheduling information for paging message in the DCI, where the DCI is transmitted in the PO as determined above.

If the UE specific DRX cycle (T2) is not greater than the default DRX cycle (T1), the UE determines the PF and the PO for both the paging message and the short message monitoring based on DRX cycle (T3)=Min (default DRX cycle (T1), UE specific DRX cycle (T2)) at operation 270. Specifically, the UE determines DRX cycle (T3), where T3=Min (default DRX cycle (T1), UE specific DRX cycle (T2)). The UE determines the PF, where the PF is the SFN which satisfies (SFN+PF_offset) mod T3=(T3 div N)*(UE_ID mod N). The UE determines its PO corresponding to the determined PF as explained earlier. In the determined PO, the UE monitors the PDCCH addressed to the P-RNTI for the short message and the paging message. If the DCI addressed to the P-RNTI includes scheduling information for a paging message, the UE decodes the DL TB based on the received scheduling information. In the paging message received in the decoded DL TB, the UE checks for its paging identity (e.g., S-TMSI). If the paging message is there for the UE, the gNB includes scheduling information for paging message in the DCI, where the DCI is transmitted in the PO as determined above. Alternately, for short message monitoring, the UE determines the DRX cycle (T4), where T4=modification period. The modification period is signaled by the gNB in SIB1. The UE determines the PF, where the PF is the SFN which satisfies (SFN+PF_offset) mod T4=(T4 div N)*(UE_ID mod N). The UE determines its PO corresponding to the determined PF as explained earlier. In the determined PO, the UE monitors the PDCCH addressed to the P-RNTI for the short message. If the DCI addressed to the P-RNTI includes the short message, the UE processes the received short message.

Figure 3:
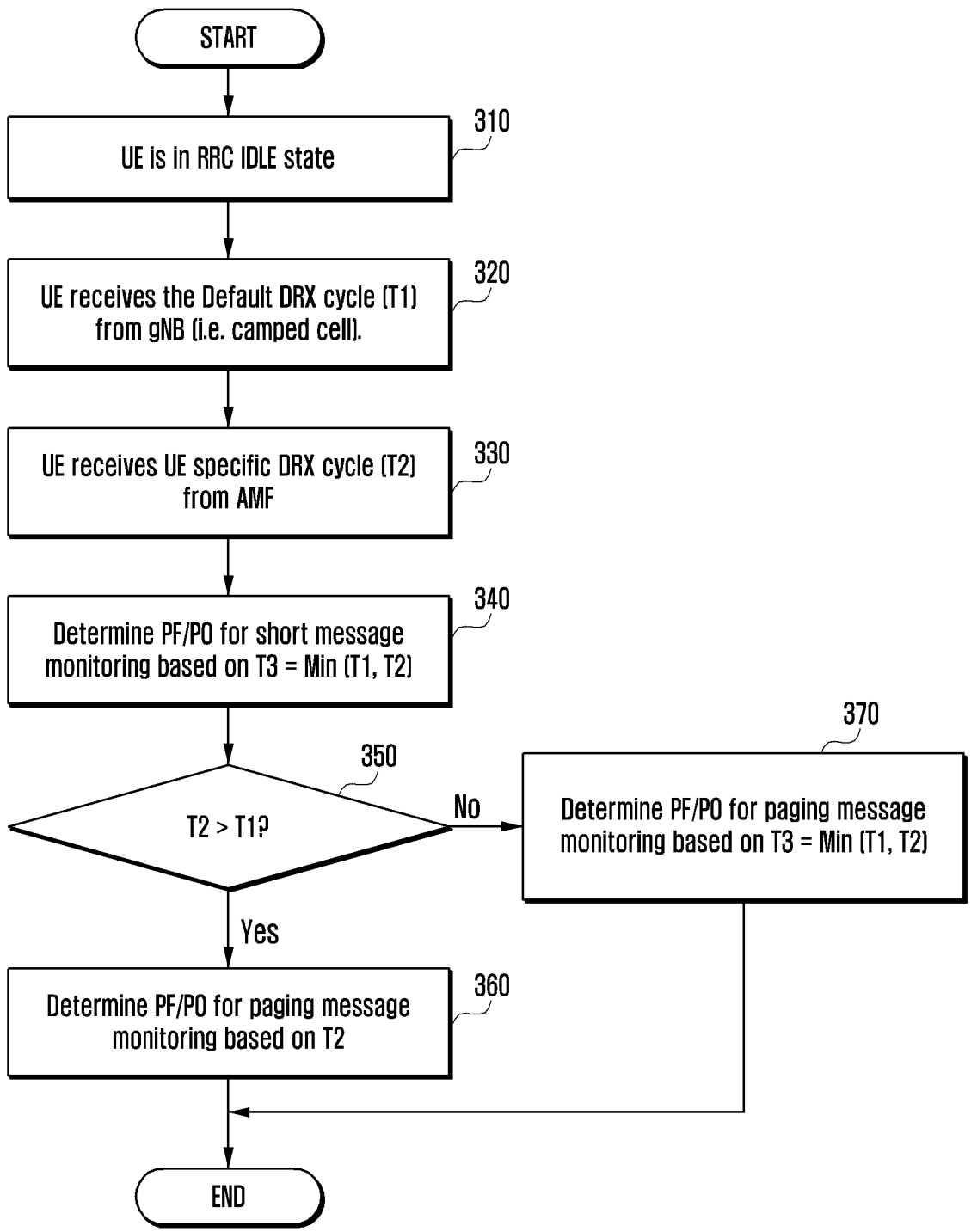
FIG. 3 illustrates a UE operation based on Method 1 according to an embodiment of the disclosure.

FIG. 3 illustrates a UE operation based on Method 1 according to an embodiment of the disclosure.

Referring to FIG. 3, UE is in RRC_IDLE state at operation 310.

The UE receives the default DRX cycle (T1) from the gNB (i.e., the camped cell) at operation 320. The default DRX cycle (T1) along with other parameters, i.e., N, Ns and PF_offset are received in a paging channel configuration. The paging channel configuration is received in SI (e.g., SystemInformationBlock1) by the UE. The UE also receives a paging search space configuration from the gNB. The paging search space configuration is received in SI (e.g., SystemInformationBlock1) by the RRC_IDLE UE.

The UE receives the UE specific DRX cycle (T2) from the upper layer at operation 330. The upper layer receives the same from the AMF or negotiates the same with the AMF.

The UE determines the PF and the PO for short message monitoring based on DRX cycle (T3)=Min (default DRX cycle (T1), UE specific DRX cycle (T2)) at operation 340. Specifically, the UE determines DRX cycle (T3), where T3=Min (default DRX cycle (T1), UE specific DRX cycle (T2)). The UE determines the PF, where the PF is the SFN which satisfies (SFN+PF_offset) mod T3=(T3 div N)*(UE_ID mod N). The UE determines its PO corresponding to the determined PF as explained earlier. In the determined PO, the UE monitors the PDCCH addressed to the P-RNTI for the short message. If the DCI addressed to the P-RNTI includes the short message, the UE processes the received short message. Alternately, for short message monitoring, the UE determines the DRX cycle (T4), where T4=modification period. The modification period is signaled by the gNB in SIB1. The UE determines the PF, where the PF is the SFN which satisfies (SFN+PF_offset) mod T4=(T4 div N)*(UE_ID mod N). The UE determines its PO corresponding to the determined PF as explained earlier. In the determined PO, the UE monitors the PDCCH addressed to the P-RNTI for the short message. If the DCI addressed to the P-RNTI includes the short message, the UE processes the received short message.

The UE determines whether the UE specific DRX cycle (T2) is greater than the default DRX cycle (T1) or not at operation 350.

If the UE specific DRX cycle (T2) is greater than the default DRX cycle (T1), the UE determines the PF and the PO for paging message monitoring based on the UE specific DRX cycle (T2) at operation 360. Specifically, the UE determines the PF, where the PF is the SFN which satisfies (SFN+PF_offset) mod T2=(T2 div N)*(UE_ID mod N). The UE determines its PO corresponding to the determined PF as explained earlier. In the determined PO, the UE monitors the PDCCH addressed to the P-RNTI for the paging message. If the DCI addressed to the P-RNTI includes the scheduling information for the paging message, the UE decodes the DL TB based on the received scheduling information. In the paging message received in the decoded DL TB, the UE checks for its paging identity (e.g., S-TMSI). If the paging message is there for the UE, the gNB includes scheduling information for the paging message in the DCI, where the DCI is transmitted in the PO as determined above.

If the UE specific DRX cycle (T2) is not greater than the default DRX cycle (T1), the UE determines the PF and the PO for paging message monitoring based on DRX cycle (T3)=Min (default DRX cycle (T1), UE specific DRX cycle (T2)) at operation 370. Specifically, the UE determines the DRX cycle (T3), where T3=Min (default DRX cycle (T1), UE specific DRX cycle (T2)). The UE determines the PF, where the PF is the SFN which satisfies (SFN+PF_offset) mod T3=(T3 div N)*(UE_ID mod N). The UE determines its PO corresponding to the determined PF as explained earlier. In the determined PO, the UE monitors the PDCCH addressed to the P-RNTI for the paging message. If the DCI addressed to the P-RNTI includes scheduling information for the paging message, the UE decodes the DL TB based on the received scheduling information. In the paging message received in the decoded DL TB, the UE checks for its paging identity (e.g., S-TMSI). If the paging message is there for the UE, the gNB includes scheduling information for the paging message in the DCI, where the DCI is transmitted in PO as determined above.

Figure 4:
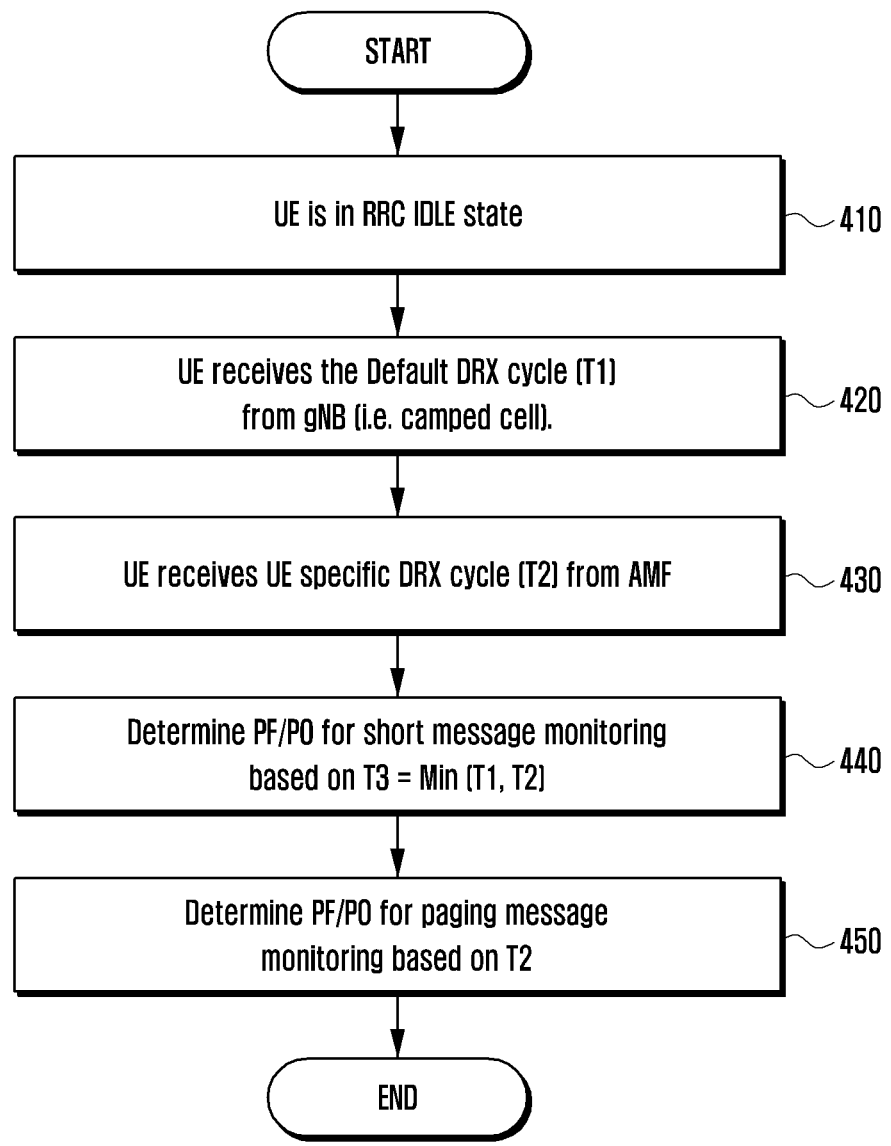
FIG. 4 illustrates a UE operation based on Method 1 according to an embodiment of the disclosure.

FIG. 4 illustrates a UE operation based on Method 1 according to an embodiment of the disclosure.

Referring to FIG. 4, the UE is in an RRC_IDLE state at operation 410.

The UE receives the default DRX cycle (T1) from the gNB (i.e., the camped cell) at operation 420. The default DRX cycle (T1) along with other parameters, i.e., N, Ns and PF_offset is received in a paging channel configuration. The paging channel configuration is received in a SI (e.g., SystemInformationBlock1) by the UE. The UE also receives paging search space configuration from the gNB. The paging search space configuration is received in the SI (e.g., SystemInformationBlock1) by the RRC_IDLE UE.

The UE receives the UE specific DRX cycle (T2) from the upper layer at operation 430. The upper layer receives the same from the AMF or negotiates the same with the AMF.

The UE determines the PF and the PO for short message monitoring and monitors the POs for the short message based on DRX cycle (T3) at operation 440, where T3=min (default DRX cycle (T1), UE specific DRX cycle (T2)). Specifically, the UE determines PF, where the PF is the SFN which satisfies (SFN+PF_offset) mod T3=(T3 div N)* (UE_ID mod N). The UE determines its PO corresponding to the determined PF as explained earlier. In the determined PO, the UE monitors the PDCCH addressed to the P-RNTI for the short message. If the DCI addressed to the P-RNTI includes the short message, the UE processes the received short message. Alternately, for short message monitoring, the UE determines the DRX cycle (T4), where T4=modification period. The modification period is signaled by the gNB in the SIB1. The UE determines the PF, where the PF is the SFN which satisfies (SFN+PF_offset) mod T4=(T4 div N)*(UE_ID mod N). The UE determines its PO corresponding to the determined PF as explained earlier. In the determined PO, the UE monitors the PDCCH addressed to the P-RNTI for the short message. If the DCI addressed to the P-RNTI includes the short message, the UE processes the received short message.

The UE determines the PF and the PO for paging message monitoring and monitors the Pos for the paging message based on the UE specific DRX cycle (T2) at operation 450. Specifically, the UE determines the PF, where the PF is the SFN which satisfies (SFN+PF_offset) mod T2=(T2 div N)*(UE_ID mod N). The UE determines its PO corresponding to the determined PF as explained earlier. In the determined PO, the UE monitors the PDCCH addressed to the P-RNTI for the paging message. If the DCI addressed to the P-RNTI includes scheduling information for the paging message, the UE decodes the DL TB based on the received scheduling information. In the paging message received in the decoded DL TB, the UE checks for its paging identity (e.g., S-TMSI). If paging message is there for the UE, the gNB includes the scheduling information for the paging message in the DCI, where the DCI is transmitted in the PO as determined above.

It is to be noted that a BS also determines a PF and a PO for paging message transmission to a UE in same manner as determined by the UE (explained in embodiments). The UE specific DRX cycle (T2) is sent to the BS by an AMF.

In an embodiment, a UE may indicate to a network (e.g., a gNB) whether it prefers to monitor a paging message according to a UE specific paging cycle. The indication can be sent in a UE capability information message. An AMF can indicate this UE capability to a gNB along with a paging message to the gNB. If indicated, the gNB also determines a PF and a PO for paging message transmission to the UE in same manner as determined by the UE (explained in embodiments).

Figure 5:
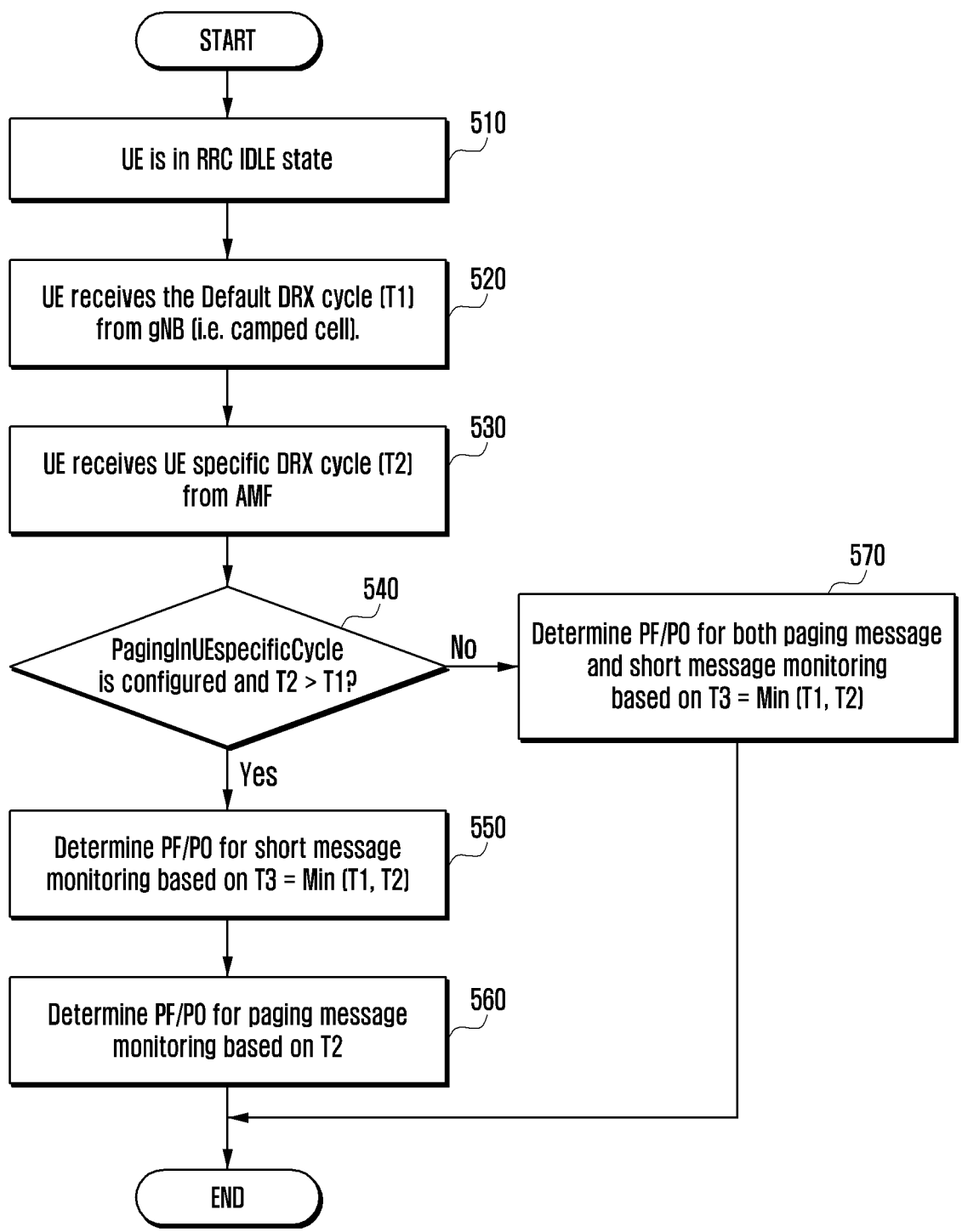
FIG. 5 illustrates a UE operation based on Method 2 according to an embodiment of the disclosure.

Method 2:

FIG. 5 illustrates a UE operation based on Method 2 according to an embodiment of the disclosure.

Referring to FIG. 5, the UE is in an RRC_IDLE state at operation 510.

The UE receives the default DRX cycle (T1) from the gNB (i.e., the camped cell) at operation 520. The default DRX cycle (T1) along with other parameters, i.e., N, Ns and PF_offset are received in the paging channel configuration. The paging channel configuration is received in the SI (e.g., SystemInformationBlock1) by the UE. The UE also receives paging search space configuration from the gNB. The paging search space configuration is received in the SI (e.g., SystemInformationBlock1) by the RRC_IDLE UE.

The UE receives the UE specific DRX cycle (T2) from the upper layer at operation 530. The upper layer receives the same from the AMF or negotiates the same with the AMF.

The UE determines whether PagingInUEspecificCycle is configured and the UE specific DRX cycle (T2) is greater than default DRX cycle (T1) or not at operation 540. PagingInUEspecificCycle is signaled by the gNB (i.e., the camped cell). It can be signaled in the SI (e.g., SystemInformationBlock1). PagingInUEspecificCycle is a 1 bit indicator. It indicates that the UE should monitor PF/PO for paging based on the UE specific DRX cycle (T2). In an embodiment, if PagingInUEspecificCycle is received from the gNB, it is considered as configured. Otherwise not. In another embodiment, if PagingInUEspecificCycle set to TRUE is received from the gNB, it is considered as configured. Otherwise not.

If PagingInUEspecificCycle is configured and the UE specific DRX cycle (T2) is greater than default DRX cycle (T1), the UE determines the PF and the PO for short message monitoring based on DRX cycle (T3)=Min (default DRX cycle (T1), UE specific DRX cycle (T2)) at operation 550. Specifically, the UE determines the DRX cycle (T3), where T3=Min (default DRX cycle (T1), UE specific DRX cycle (T2)). The UE determines the PF, where the PF is the SFN which satisfies (SFN+PF_offset) mod T3=(T3 div N)* (UE_ID mod N). The UE determines its PO corresponding to the determined PF as explained earlier. In the determined PO, the UE monitors the PDCCH addressed to the P-RNTI for short message. If the DCI addressed to the P-RNTI includes the short message, the UE processes the received short message. Alternately, for the short message monitoring, the UE determines the DRX cycle (T4), where T4=modification period. The modification period is signaled by the gNB in the SIB1. The UE determines the PF, where the PF is the SFN which satisfies (SFN+PF_offset) mod T4=(T4 div N)*(UE_ID mod N). The UE determines its PO corresponding to the determined PF as explained earlier. In the determined PO, the UE monitors the PDCCH addressed to the P-RNTI for the short message. If the DCI addressed to the P-RNTI includes the short message, the UE processes the received short message.

The UE determines the PF and the PO for paging message monitoring based on the UE specific DRX cycle (T2) at operation 560. Specifically, the UE determines the PF, where the PF is the SFN which satisfies (SFN+PF_offset) mod T2=(T2 div N)*(UE_ID mod N). The UE determines its PO corresponding to the determined PF as explained earlier. In the determined PO, the UE monitors the PDCCH addressed to the P-RNTI for the paging message. If the DCI addressed to the P-RNTI includes the scheduling information for the paging message, the UE decodes the DL TB based on received scheduling information. In the paging message received in decoded DL TB, the UE checks for its paging identity (e.g., S-TMSI). If the paging message is there for the UE, the gNB includes scheduling information for paging message in the DCI, where the DCI is transmitted in PO as determined above.

Else (i.e., if the UE specific DRX cycle (T2) is not greater than default DRX cycle (T1) or if PagingInUEspecificCycle is not configured), the UE determines the PF and the PO for both the paging message and the short message monitoring based on DRX cycle (T3)=Min (default DRX cycle (T1), UE specific DRX cycle (T2)) at operation 570. Specifically, the UE determines DRX cycle (T3), where T3=Min (default DRX cycle (T1), UE specific DRX cycle (T2)). The UE determines the PF, where the PF is the SFN which satisfies (SFN+PF_offset) mod T3=(T3 div N)*(UE_ID mod N). The UE determines its PO corresponding to the determined PF as explained earlier. In the determined PO, the UE monitors the PDCCH addressed to the P-RNTI for the short message and the paging message. If the DCI addressed to the P-RNTI includes the scheduling information for the paging message, the UE decodes the DL TB based on the received scheduling information. In the paging message received in the decoded DL TB, the UE checks for its paging identity (e.g., S-TMSI). If the paging message is there for the UE, the gNB includes scheduling information for paging message in the DCI, where the DCI is transmitted in PO as determined above. Alternately, for short message monitoring, the UE determines the DRX cycle (T4), where T4=modification period. The modification period is signaled by the gNB in the SIB1. The UE determines the PF, where the PF is the SFN which satisfies (SFN+PF_offset) mod T4=(T4 div N)*(UE_ID mod N). The UE determines its PO corresponding to the determined PF as explained earlier. In the determined PO, the UE monitors the PDCCH addressed to the P-RNTI for the short message. If the DCI addressed to the P-RNTI includes the short message, the UE processes the received short message.

Figure 6:
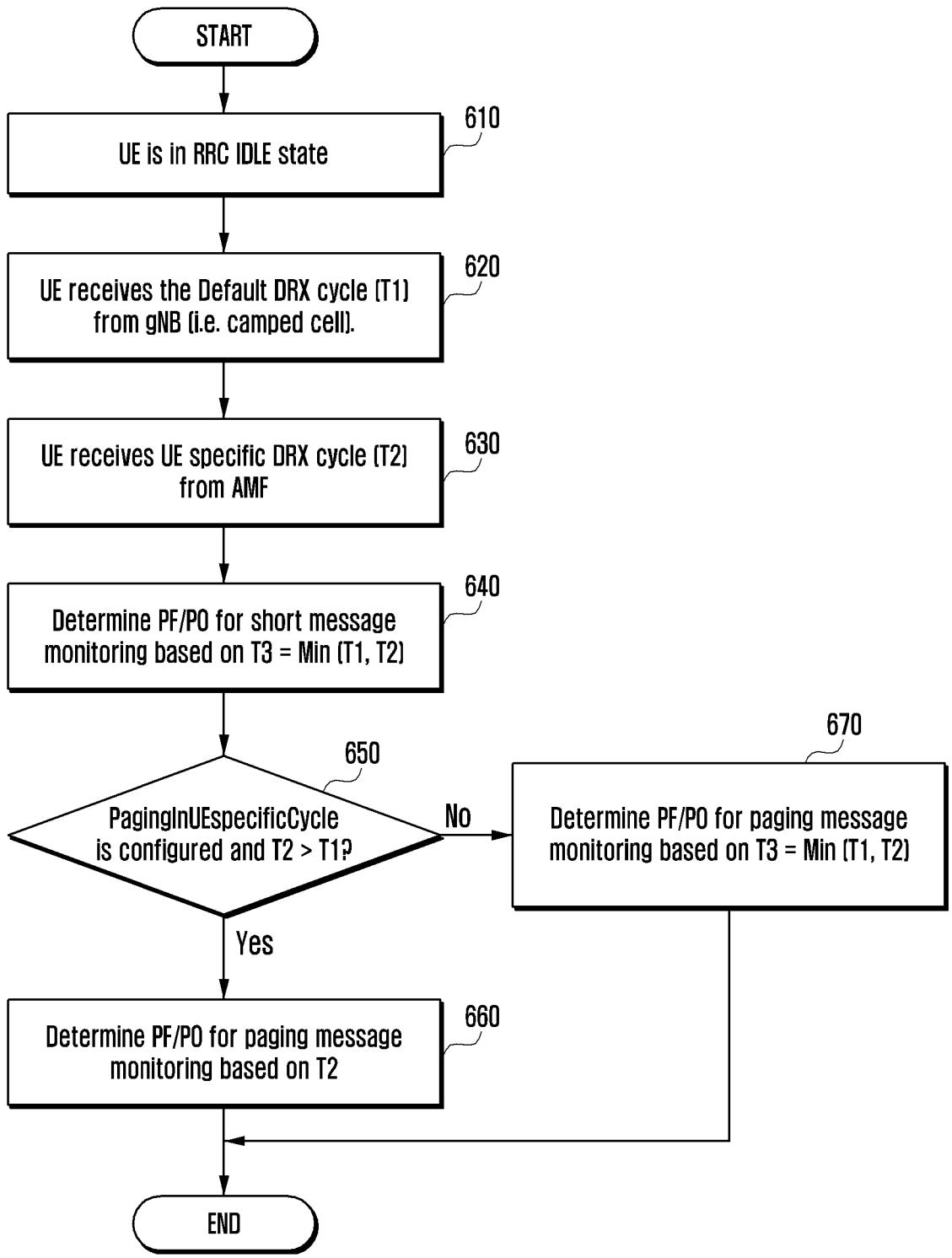
FIG. 6 illustrates a UE operation based on Method 2 according to an embodiment of the disclosure.

FIG. 6 illustrates a UE operation based on Method 2 according to an embodiment of the disclosure.

Referring to FIG. 6, the UE is in RRC_IDLE state at operation 610.

The UE receives the default DRX cycle (T1) from the gNB (i.e., the camped cell) at operation 620. The default DRX cycle (T1) along with other parameters, i.e., N, Ns and PF_offset are received in a paging channel configuration. The paging channel configuration is received in the SI (e.g., SystemInformationBlock1) by the UE. The UE also receives paging search space configuration from the gNB. The paging search space configuration is received in the SI (e.g., SystemInformationBlock1) by the RRC_IDLE UE.

The UE receives the UE specific DRX cycle (T2) from an upper layer at operation 630. The upper layer receives the same from the AMF or negotiates the same with the AMF.

The UE determines the PF and the PO for the short message monitoring based on DRX cycle (T3)=Min (default DRX cycle (T1), UE specific DRX cycle (T2)) at operation 640. Specifically, the UE determines the DRX cycle (T3), where T3=Min (default DRX cycle (T1), UE specific DRX cycle (T2)). The UE determines the PF, where the PF is the SFN which satisfies (SFN+PF_offset) mod T3=(T3 div N)*(UE_ID mod N). The UE determines its PO corresponding to the determined PF as explained earlier. In the determined PO, the UE monitors the PDCCH addressed to the P-RNTI for the short message. If the DCI addressed to the P-RNTI includes the short message, the UE processes the received short message. Alternately, for the short message monitoring, the UE determines the DRX cycle (T4), where T4=modification period. The modification period is signaled by the gNB in the SIB1. The UE determines the PF, where the PF is the SFN which satisfies (SFN+PF_offset) mod T4=(T4 div N)*(UE_ID mod N). The UE determines its PO corresponding to the determined PF as explained earlier. In the determined PO, the UE monitors the PDCCH addressed to the P-RNTI for the short message. If the DCI addressed to the P-RNTI includes the short message, the UE processes the received short message.

The UE determines whether PagingInUEspecificCycle is configured and the UE specific DRX cycle (T2) is greater than default DRX cycle (T1) or not at operation 650. PagingInUEspecificCycle is signaled by the gNB (i.e., the camped cell). It can be signaled in the SI (e.g., SystemInformationBlock1). PagingInUEspecificCycle is a 1 bit indicator. It indicates that the UE should monitor PF/PO for paging based on the UE specific DRX cycle (T2). In an embodiment, if PagingInUEspecificCycle is received from the gNB, it is considered as configured. Otherwise not. In another embodiment, if PagingInUEspecificCycle set to TRUE is received from the gNB, it is considered as configured. Otherwise not.

If PagingInUEspecificCycle is configured and the UE specific DRX cycle (T2) is greater than the default DRX cycle (T1), the UE determines the PF and the PO for paging message monitoring based on the UE specific DRX cycle (T2) at operation 660. Specifically, the UE determines the PF, where the PF is the SFN which satisfies (SFN+PF_offset) mod T2=(T2 div N)*(UE_ID mod N). The UE determines its PO corresponding to the determined PF as explained earlier. In the determined PO, the UE monitors the PDCCH addressed to the P-RNTI for the paging message. If the DCI addressed to the P-RNTI includes the scheduling information for the paging message, the UE decodes the DL TB based on received scheduling information. In the paging message received in decoded DL TB, the UE checks for its paging identity (e.g., S-TMSI). If paging message is there for the UE, the gNB includes scheduling information for the paging message in the DCI, where the DCI is transmitted in the PO as determined above.

Else (i.e., if the UE specific DRX cycle (T2) is not greater than default DRX cycle (T1) or PagingInUEspecificCycle is not configured), the UE determines the PF and the PO for paging message monitoring based on DRX cycle (T3)=Min (default DRX cycle (T1), UE specific DRX cycle (T2)) at operation 670. Specifically, the UE determines the DRX cycle (T3), where T3=Min (default DRX cycle (T1), UE specific DRX cycle (T2)). The UE determines the PF, where the PF is the SFN which satisfies (SFN+PF_offset) mod T3=(T3 div N)*(UE_ID mod N). The UE determines its PO corresponding to the determined PF as explained earlier. In the determined PO, the UE monitors the PDCCH addressed to the P-RNTI for the paging message. If the DCI addressed to the P-RNTI includes the scheduling information for the paging message, the UE decodes the DL TB based on the received scheduling information. In the paging message received in decoded DL TB, the UE checks for its paging identity (e.g., S-TMSI). If the paging message is there for the UE, the gNB includes the scheduling information for the paging message in the DCI, where the DCI is transmitted in PO as determined above.

Figure 7:
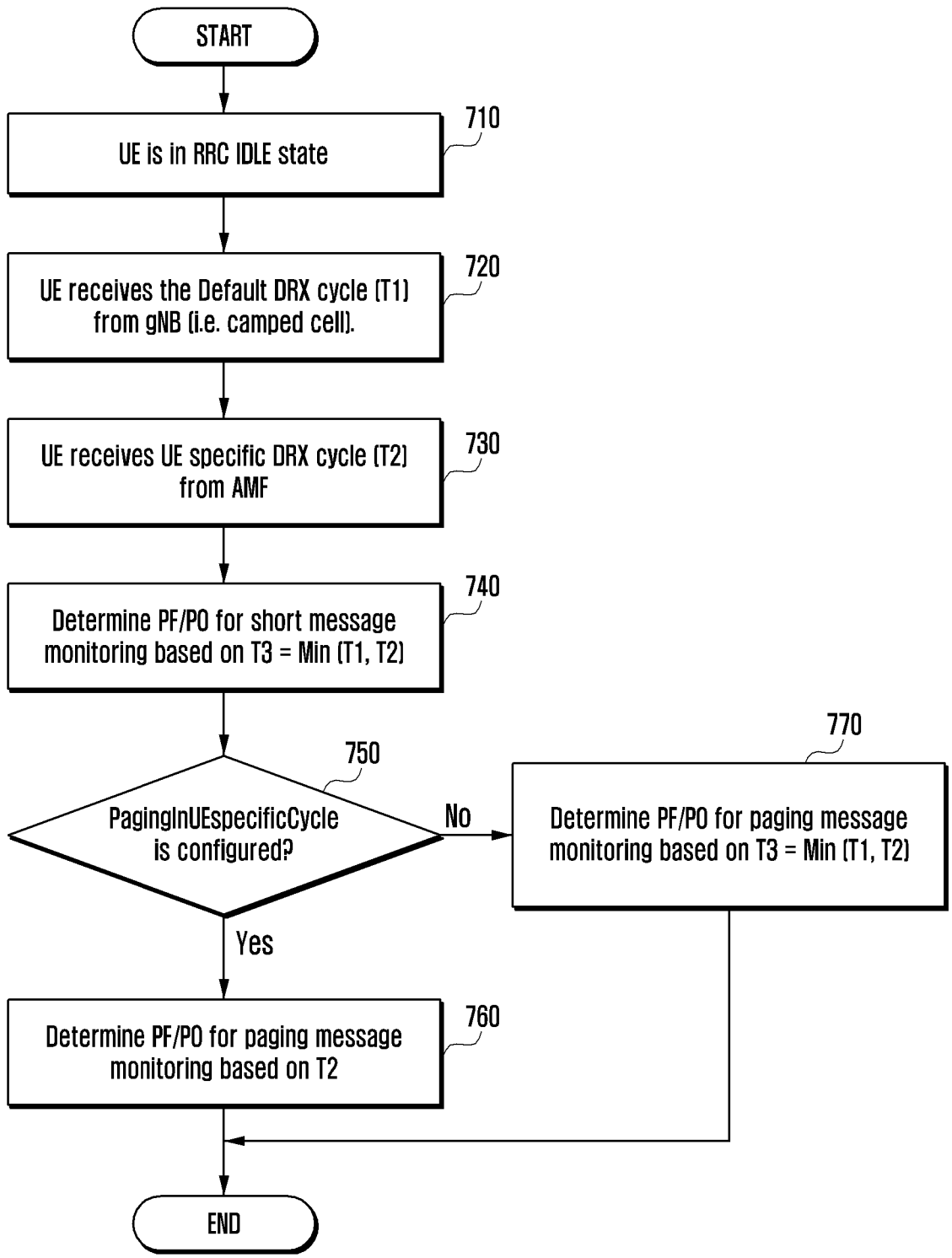
FIG. 7 illustrates a UE operation based on Method 2 according to an embodiment of the disclosure.

FIG. 7 illustrates a UE operation based on Method 2 according to an embodiment of the disclosure.

Referring to FIG. 7, the UE is in an RRC_IDLE state at operation 710.

The UE receives the default DRX cycle (T1) from the gNB (i.e., the camped cell) at operation 720. The default DRX cycle (T1) along with other parameters, i.e., N, Ns and PF_offset are received in a paging channel configuration. The paging channel configuration is received in the SI (e.g., SystemInformationBlock1) by the UE. The UE also receives paging search space configuration from the gNB. The paging search space configuration is received in the SI (e.g., SystemInformationBlock1) by the RRC_IDLE UE.

The UE receives the UE specific DRX cycle (T2) from an upper layer at operation 730. The upper layer receives the same from the AMF or negotiates the same with the AMF.

The UE determines the PF and the PO for the short message monitoring and monitors the POs for the short message based on the DRX cycle (T3) at operation 740, where T3=min (default DRX cycle (T1), UE specific DRX cycle (T2)). Specifically, the UE determines the PF, where the PF is the SFN which satisfies (SFN+PF_offset) mod T3=(T3 div N)*(UE_ID mod N). The UE determines its PO corresponding to the determined PF as explained earlier. In the determined PO, the UE monitors the PDCCH addressed to the P-RNTI for the short message. If the DCI addressed to the P-RNTI includes the short message, the UE processes the received short message. Alternately, for short message monitoring, the UE determines the DRX cycle (T4), where T4=modification period. The modification period is signaled by the gNB in the SIB1. The UE determines the PF, where the PF is the SFN which satisfies (SFN+PF_offset) mod T4=(T4 div N)*(UE_ID mod N). The UE determines its PO corresponding to the determined PF as explained earlier. In the determined PO, the UE monitors the PDCCH addressed to the P-RNTI for the short message. If the DCI addressed to the P-RNTI includes the short message, the UE processes the received short message.

The UE determines whether PagingInUEspecificCycle is configured at operation 750. PagingInUEspecificCycle is signaled by the gNB (i.e., the camped cell). It can be signaled in the SI (e.g., SystemInformationBlock1). PagingInUEspecificCycle is a 1 bit indicator. It indicates that the UE should monitor PF/PO for paging based on the UE specific DRX cycle (T2). In an embodiment, if PagingInUEspecificCycle is received from the gNB, it is considered as configured. Otherwise not. In another embodiment, if PagingInUEspecificCycle set to TRUE is received from the gNB, it is considered as configured. Otherwise not.

If PagingInUEspecificCycle is configured, the UE determines the PF and the PO for paging message monitoring and monitors the POs for the paging message based on the UE specific DRX cycle (T2) at operation 760. Specifically, the UE determines the PF, where the PF is the SFN which satisfies (SFN+PF_offset) mod T2=(T2 div N)*(UE_ID mod N). The UE determines its PO corresponding to the determined PF as explained earlier. In the determined PO, the UE monitors the PDCCH addressed to the P-RNTI for the paging message. If the DCI addressed to the P-RNTI includes the scheduling information for the paging message, the UE decodes the DL TB based on the received scheduling information. In the paging message received in the decoded DL TB, the UE checks for its paging identity (e.g., S-TMSI). If the paging message is there for the UE, the gNB includes the scheduling information for the paging message in the DCI, where the DCI is transmitted in PO as determined above.

Else (i.e., if PagingInUEspecificCycle is not configured), the UE determines the PF and the PO for paging message monitoring and monitors the POs for the paging message based on DRX cycle (T3)=min (default DRX cycle (T1), the UE specific DRX cycle (T2)) at operation 770. Specifically, the UE determines the PF, where the PF is the SFN which satisfies (SFN+PF_offset) mod T3=(T3 div N)*(UE_ID mod N). The UE determines its PO corresponding to the determined PF as explained earlier. In the determined PO, the UE monitors the PDCCH addressed to the P-RNTI for the paging message. If the DCI addressed to the P-RNTI includes scheduling information for the paging message, the UE decodes the DL TB based on received scheduling information. In the paging message received in the decoded DL TB, the UE checks for its paging identity (e.g., S-TMSI). If the paging message is there for the UE, the gNB includes the scheduling information for the paging message in the DCI, where the DCI is transmitted in PO as determined above.

It is to be noted that a BS also determines a PF and a PO for paging message transmission to a UE in same manner as determined by the UE (explained in embodiments). The UE specific DRX cycle (T2) is sent to the BS by an AMF.

In an embodiment, a UE may indicate to a network (e.g., a gNB) whether it prefers to monitor a paging message according to a UE specific paging cycle. The indication can be sent in a UE capability information message. An AMF can indicate this UE capability to a gNB along with a paging message to the gNB. If indicated, the gNB also determines a PF and a PO for paging message transmission to the UE in same manner as determined by the UE (explained in embodiments).

Figure 8:
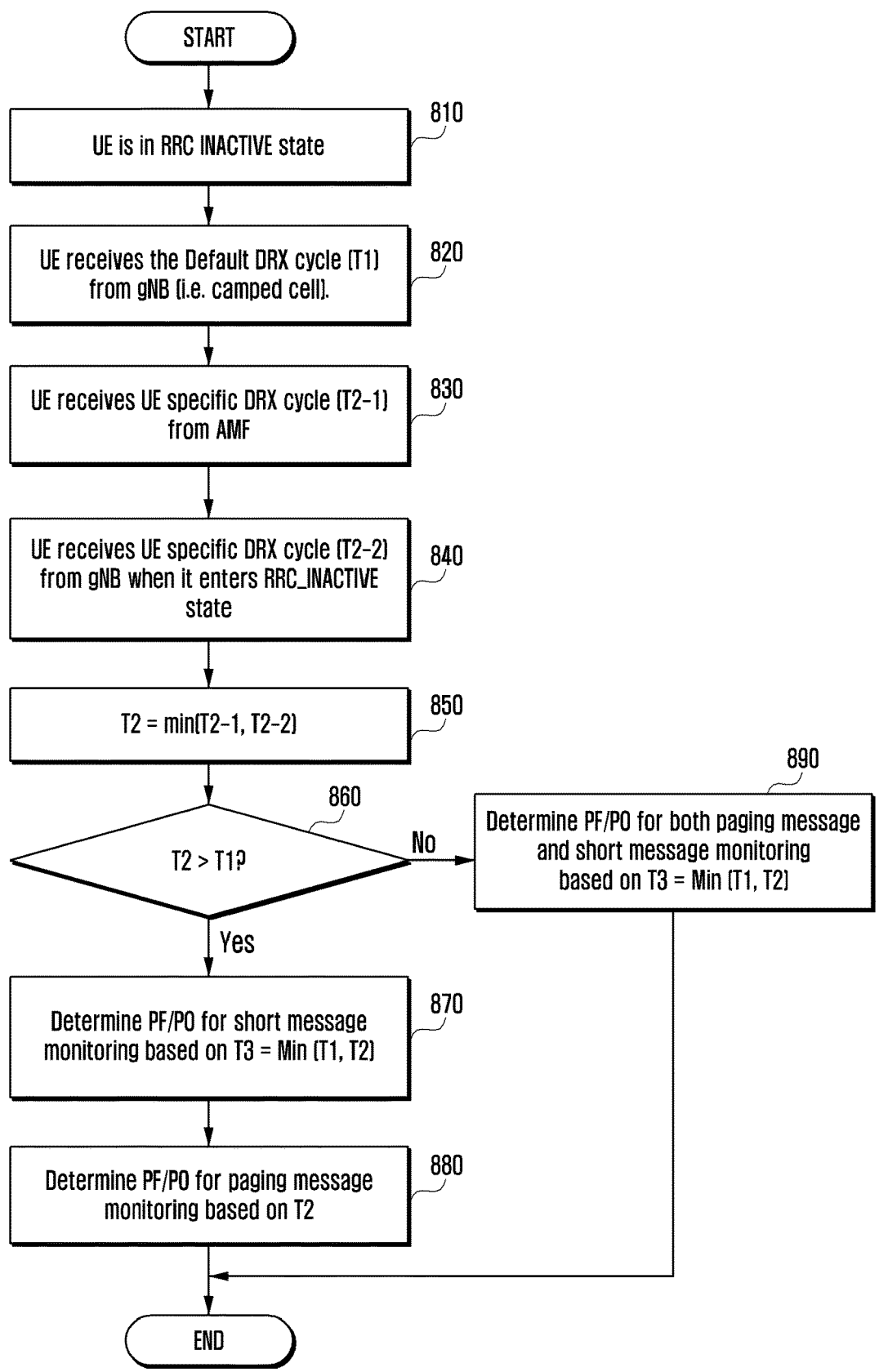
FIG. 8 illustrates a UE operation based on Method 3 according to an embodiment of the disclosure.

Paging Enhancement for Power Saving in RRC_INACTIVE
Method 3:

FIG. 8 illustrates a UE operation based on Method 3 according to an embodiment of the disclosure.

Referring to FIG. 8, the UE is in an RRC_INACTIVE state at operation 810.

The UE receives the default DRX cycle (T1) from the gNB (i.e., the camped cell) at operation 820. The default DRX cycle (T1) along with other parameters, i.e., N, Ns and PF_offset are received in paging channel configuration. The paging channel configuration is received in the SI (e.g., SystemInformationBlock1) by the UE. The UE also receives paging search space configuration from the gNB. The paging search space configuration is received in the SI (e.g., SystemInformationBlock1) by RRC_IDLE/RRC_INACTIVE UE.

The UE receives the UE specific DRX cycle (T2-1) from an upper layer at operation 830. The upper layer receives the same from the AMF or negotiates the same with the AMF.

The UE receives the UE specific DRX cycle (T2-2) from the gNB when it enters the RRC_INACTIVE state at operation 840.

The UE determines the UE specific DRX cycle T2=min (T2-1, T2-2) at operation 850.

The UE determines whether the UE specific DRX cycle (T2) is greater than default DRX cycle (T1) or not at operation 860.

If the UE specific DRX cycle (T2) is greater than the default DRX cycle (T1), the UE determines the PF and the PO for short message monitoring based on DRX cycle (T3)=Min (default DRX cycle (T1), UE specific DRX cycle (T2)) at operation 870. Specifically, the UE determines the DRX cycle (T3), where T3=Min (default DRX cycle (T1), UE specific DRX cycle (T2)). The UE determines the PF, where the PF is the SFN which satisfies (SFN+PF_offset) mod T3=(T3 div N)*(UE_ID mod N). The UE determines its PO corresponding to the determined PF as explained earlier. In the determined PO, the UE monitors the PDCCH addressed to the P-RNTI for the short message. If the DCI addressed to the P-RNTI includes the short message, the UE processes the received short message. Alternately, for short message monitoring, the UE determines the DRX cycle (T4), where T4=modification period. The modification period is signaled by the gNB in the SIB1. The UE determines the PF, where the PF is the SFN which satisfies (SFN+PF_offset) mod T4=(T4 div N)*(UE_ID mod N). The UE determines its PO corresponding to the determined PF as explained earlier. In the determined PO, the UE monitors the PDCCH addressed to the P-RNTI for the short message. If the DCI addressed to the P-RNTI includes the short message, the UE processes the received short message.

The UE determines the PF and the PO for paging message monitoring based on the UE specific DRX cycle (T2) at operation 880. Specifically, the UE determines the PF, where the PF is the SFN which satisfies (SFN+PF_offset) mod T2=(T2 div N)*(UE_ID mod N). The UE determines its PO corresponding to the determined PF as explained earlier. In the determined PO, the UE monitors the PDCCH addressed to the P-RNTI for the paging message. If the DCI addressed to the P-RNTI includes the scheduling information for the paging message, the UE decodes the DL TB based on received scheduling information. In the paging message received in decoded DL TB, the UE checks for its paging identity (e.g., S-TMSI, inactive-RNTI (I-RNTI)). If paging message is there for the UE, the gNB includes the scheduling information for the paging message in the DCI, where the DCI is transmitted in the PO as determined above.

If the UE specific DRX cycle (T2) is not greater than the default DRX cycle (T1), the UE determines the PF and the PO for both the paging message and the short message monitoring based on DRX cycle (T3)=Min (default DRX cycle (T1), UE specific DRX cycle (T2)) at operation 890. Specifically, the UE determines the DRX cycle (T3), where T3=Min (default DRX cycle (T1), UE specific DRX cycle (T2)). The UE determines the PF, where the PF is the SFN which satisfies (SFN+PF_offset) mod T3=(T3 div N)* (UE_ID mod N). The UE determines its PO corresponding to the determined PF as explained earlier. In the determined PO, the UE monitors the PDCCH addressed to the P-RNTI for the short message and the paging message. If the DCI addressed to the P-RNTI includes the scheduling information for the paging message, the UE decodes the DL TB based on received scheduling information. In the paging message received in the decoded DL TB, the UE checks for its paging identity (e.g., S-TMSI, I-RNTI). If paging message is there for the UE, the gNB includes the scheduling information for the paging message in the DCI, where the DCI is transmitted in PO as determined above. Alternately, for short message monitoring, the UE determines the DRX cycle (T4), where T4=modification period. The modification period is signaled by the gNB in the SIB1. The UE determines the PF, where the PF is the SFN which satisfies (SFN+PF_offset) mod T4=(T4 div N)*(UE_ID mod N). The UE determines its PO corresponding to the determined PF as explained earlier. In the determined PO, the UE monitors the PDCCH addressed to the P-RNTI for the short message. If the DCI addressed to the P-RNTI includes the short message, the UE processes the received short message.

Figure 9:
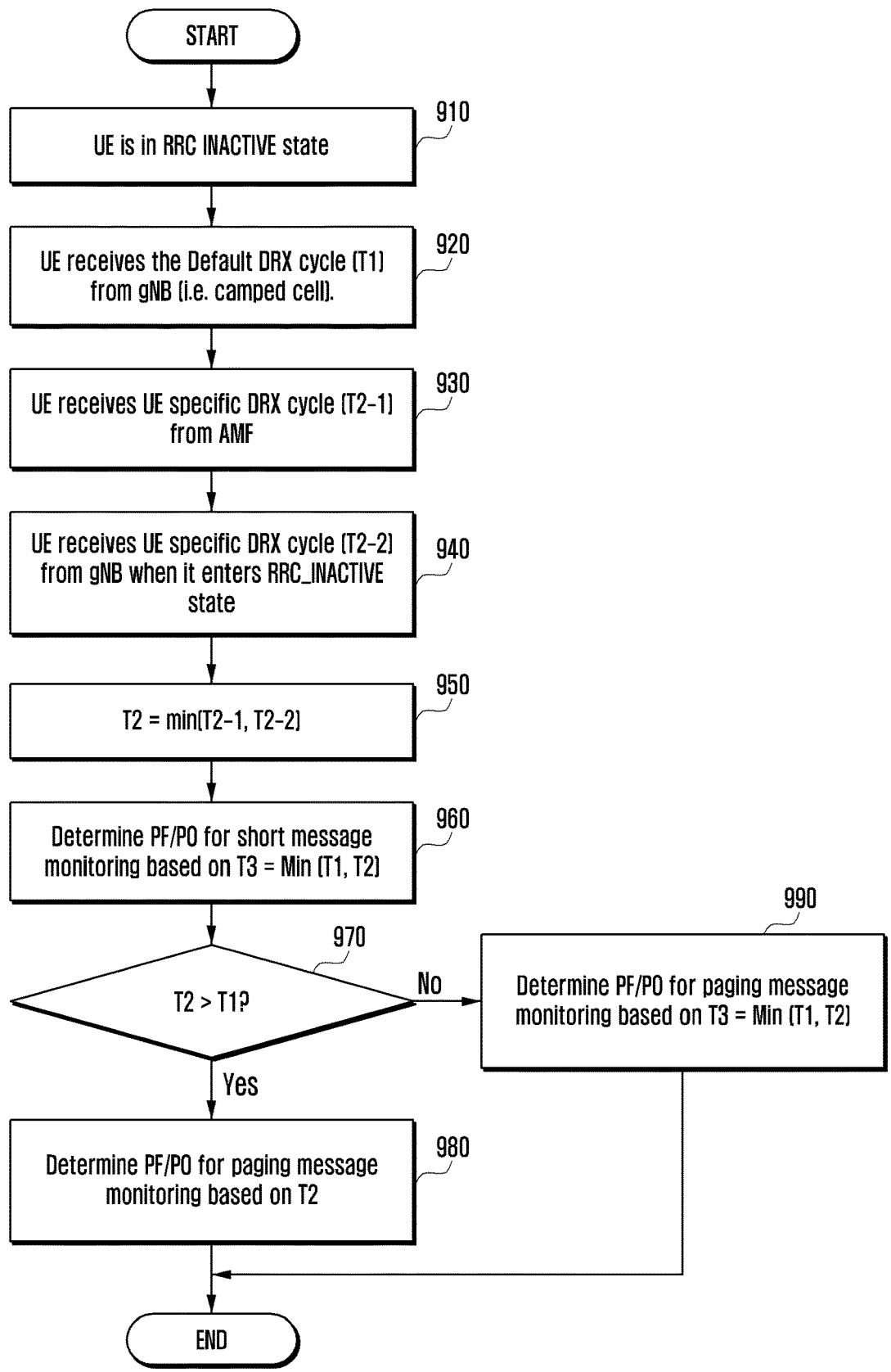
FIG. 9 illustrates a UE operation based on Method 3 according to an embodiment of the disclosure.

FIG. 9 illustrates a UE operation based on Method 3 according to an embodiment of the disclosure.

Referring to FIG. 9, the UE is in an RRC_INACTIVE state at operation 910.

The UE receives the default DRX cycle (T1) from the gNB (i.e., the camped cell) at operation 920. The default DRX cycle (T1) along with other parameters, i.e., N, Ns and PF_offset are received in a paging channel configuration. The paging channel configuration is received in the SI (e.g., SystemInformationBlock1) by the UE. The UE also receives paging search space configuration from the gNB. The paging search space configuration is received in the SI (e.g., SystemInformationBlock1) by RRC_IDLE/RRC_INACTIVE UE.

The UE receives the UE specific DRX cycle (T2-1) from the upper layer at operation 930. The upper layer receives the same from the AMF or negotiates the same with the AMF.

The UE receives the UE specific DRX cycle (T2-2) from the gNB when it enters the RRC_INACTIVE state at operation 940.

The UE determines the UE specific DRX cycle T2=min (T2-1, T2-2) at operation 950.

The UE determines the PF and the PO for short message monitoring based on DRX cycle (T3)=Min (default DRX cycle (T1), UE specific DRX cycle (T2)) at operation 960. Specifically, the UE determines the DRX cycle (T3), where T3=Min (default DRX cycle (T1), UE specific DRX cycle (T2)). The UE determines the PF, where the PF is the SFN which satisfies (SFN+PF_offset) mod T3=(T3 div N)* (UE_ID mod N). The UE determines its PO corresponding to the determined PF as explained earlier. In the determined PO, the UE monitors the PDCCH addressed to the P-RNTI for the short message. If the DCI addressed to the P-RNTI includes the short message, the UE processes the received short message. Alternately, for the short message monitoring, the UE determines the DRX cycle (T4), where T4=modification period. The modification period is signaled by the gNB in the SIB1. The UE determines the PF, where the PF is the SFN which satisfies (SFN+PF_offset) mod T4=(T4 div N)*(UE_ID mod N). The UE determines its PO corresponding to the determined PF as explained earlier. In the determined PO, the UE monitors the PDCCH addressed to the P-RNTI for the short message. If the DCI addressed to the P-RNTI includes the short message, the UE processes the received short message.

The UE determines whether the UE specific DRX cycle (T2) is greater than the default DRX cycle (T1) or not at operation 970.

If the UE specific DRX cycle (T2) is greater than the default DRX cycle (T1), the UE determines the PF and the PO for paging message monitoring based on the UE specific DRX cycle (T2) at operation 980. Specifically, the UE determines the PF, where the PF is the SFN which satisfies (SFN+PF_offset) mod T2=(T2 div N)*(UE_ID mod N). The UE determines its PO corresponding to the determined PF as explained earlier. In the determined PO, the UE monitors the PDCCH addressed to the P-RNTI for the paging message. If the DCI addressed to the P-RNTI includes the scheduling information for the paging message, the UE decodes the DL TB based on the received scheduling information. In the paging message received in the decoded DL TB, the UE checks for its paging identity (e.g., S-TMSI, I-RNTI). If the paging message is there for the UE, the gNB includes scheduling information for the paging message in the DCI, where the DCI is transmitted in the PO as determined above.

If the UE specific DRX cycle (T2) is not greater than the default DRX cycle (T1), the UE determines the PF and the PO for paging message monitoring based on the DRX cycle (T3), where T3=Min (default DRX cycle (T1), UE specific DRX cycle (T2)) at operation 990. Specifically, the UE determines the DRX cycle (T3), where T3=Min (default DRX cycle (T1), UE specific DRX cycle (T2)). The UE determines the PF, where the PF is the SFN which satisfies (SFN+PF_offset) mod T3=(T3 div N)*(UE_ID mod N). The UE determines its PO corresponding to the determined PF as explained earlier. In the determined PO, the UE monitors the PDCCH addressed to the P-RNTI for the paging message. If the DCI addressed to the P-RNTI includes the scheduling information for the paging message, the UE decodes the DL TB based on the received scheduling information. In the paging message received in decoded DL TB, the UE checks for its paging identity (e.g., S-TMSI, I-RNTI). If the paging message is there for the UE, the gNB includes scheduling information for the paging message in the DCI, where the DCI is transmitted in PO as determined above.

Figure 10:
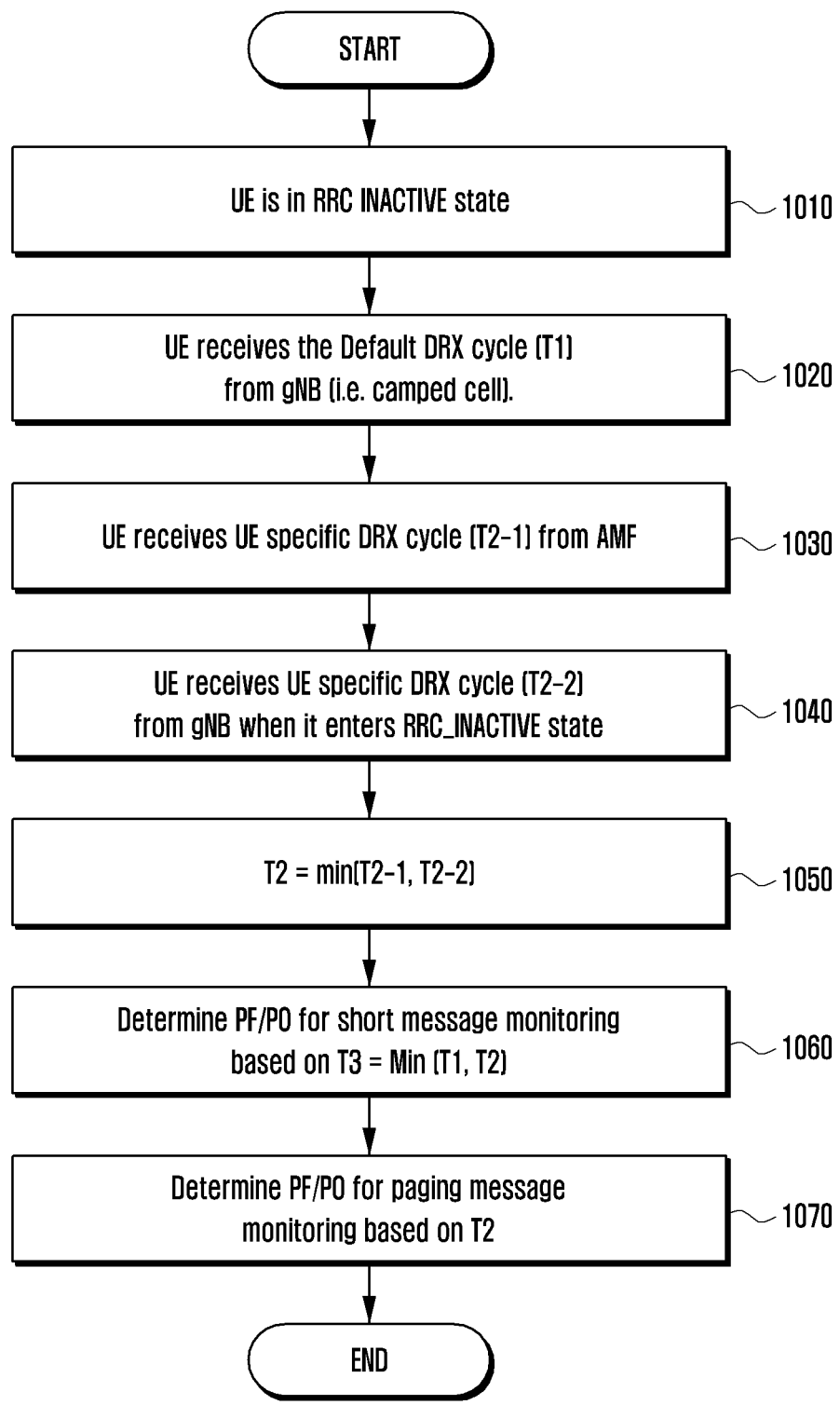
FIG. 10 illustrates a UE operation based on Method 3 according to an embodiment of the disclosure.

FIG. 10 illustrates a UE operation based on Method 3 according to an embodiment of the disclosure.

Referring to FIG. 10, the UE is in an RRC_INACTIVE state at operation 1010.

The UE receives the default DRX cycle (T1) from the gNB (i.e., the camped cell) at operation 1020. The default DRX cycle (T1) along with other parameters, i.e., N, Ns and PF_offset are received in a paging channel configuration. The paging channel configuration is received in the SI (e.g., System InformationBlock1) by the UE. The UE also receives paging search space configuration from the gNB. The paging search space configuration is received in the SI (e.g., SystemInformationBlock1) by RRC_IDLE/RRC_INACTIVE UE.

The UE receives the UE specific DRX cycle (T2-1) from an upper layer at operation 1030. The upper layer receives the same from the AMF or negotiates the same with AMF.

The UE receives the UE specific DRX cycle (T2-2) from the gNB when it enters the RRC_INACTIVE state at operation 1040.

The UE determines the UE specific DRX cycle T2=min (T2-1, T2-2) at operation 1050.

The UE determines the PF and the PO for short message monitoring and monitors the POs for the short message based on the DRX cycle (T3) at operation 1060, where T3=min (default DRX cycle (T1), UE specific DRX cycle (T2)). Specifically, the UE determines the PF, where the PF is the SFN which satisfies (SFN+PF_offset) mod T3=(T3 div N)*(UE_ID mod N). The UE determines its PO corresponding to the determined PF as explained earlier. In the determined PO, the UE monitors the PDCCH addressed to the P-RNTI for the short message. If the DCI addressed to the P-RNTI includes the short message, the UE processes the received short message. Alternately, for the short message monitoring, the UE determines the DRX cycle (T4), where T4=modification period. The modification period is signaled by the gNB in the SIB1. The UE determines the PF, where the PF is the SFN which satisfies (SFN+PF_offset) mod T4=(T4 div N)*(UE_ID mod N). The UE determines its PO corresponding to the determined PF as explained earlier. In the determined PO, the UE monitors the PDCCH addressed to the P-RNTI for the short message. If the DCI addressed to the P-RNTI includes the short message, the UE processes the received short message.

The UE determines the PF and the PO for paging message monitoring and monitors the POs for the paging message based on the UE specific DRX cycle (T2) at operation 1070. Specifically, the UE determines the PF, where the PF is the SFN which satisfies (SFN+PF_offset) mod T2=(T2 div N)*(UE_ID mod N). The UE determines its PO corresponding to the determined PF as explained earlier. In the determined PO, the UE monitors the PDCCH addressed to the P-RNTI for the paging message. If the DCI addressed to the P-RNTI includes the scheduling information for the paging message, the UE decodes the DL TB based on the received scheduling information. In the paging message received in the decoded DL TB, the UE checks for its paging identity (e.g., S-TMSI, I-RNTI). If the paging message is there for the UE, the gNB includes the scheduling information for the paging message in the DCI, where the DCI is transmitted in PO as determined above.

It is to be noted that a BS also determines a PF and a PO for paging message transmission to a UE in same manner as determined by the UE (explained in embodiments). The UE specific DRX cycle (T2-1) is sent to the BS by an AMF.

In an embodiment, a UE may indicate to a network (e.g., a gNB) whether it prefers to monitor a paging message according to a UE specific paging cycle. The indication can be sent in a UE capability information message. An AMF can indicate this UE capability to a gNB along with a paging message to the gNB. If indicated, the gNB also determines a PF and a PO for paging message transmission to the UE in same manner as determined by the UE (explained in embodiments).

Figure 11:
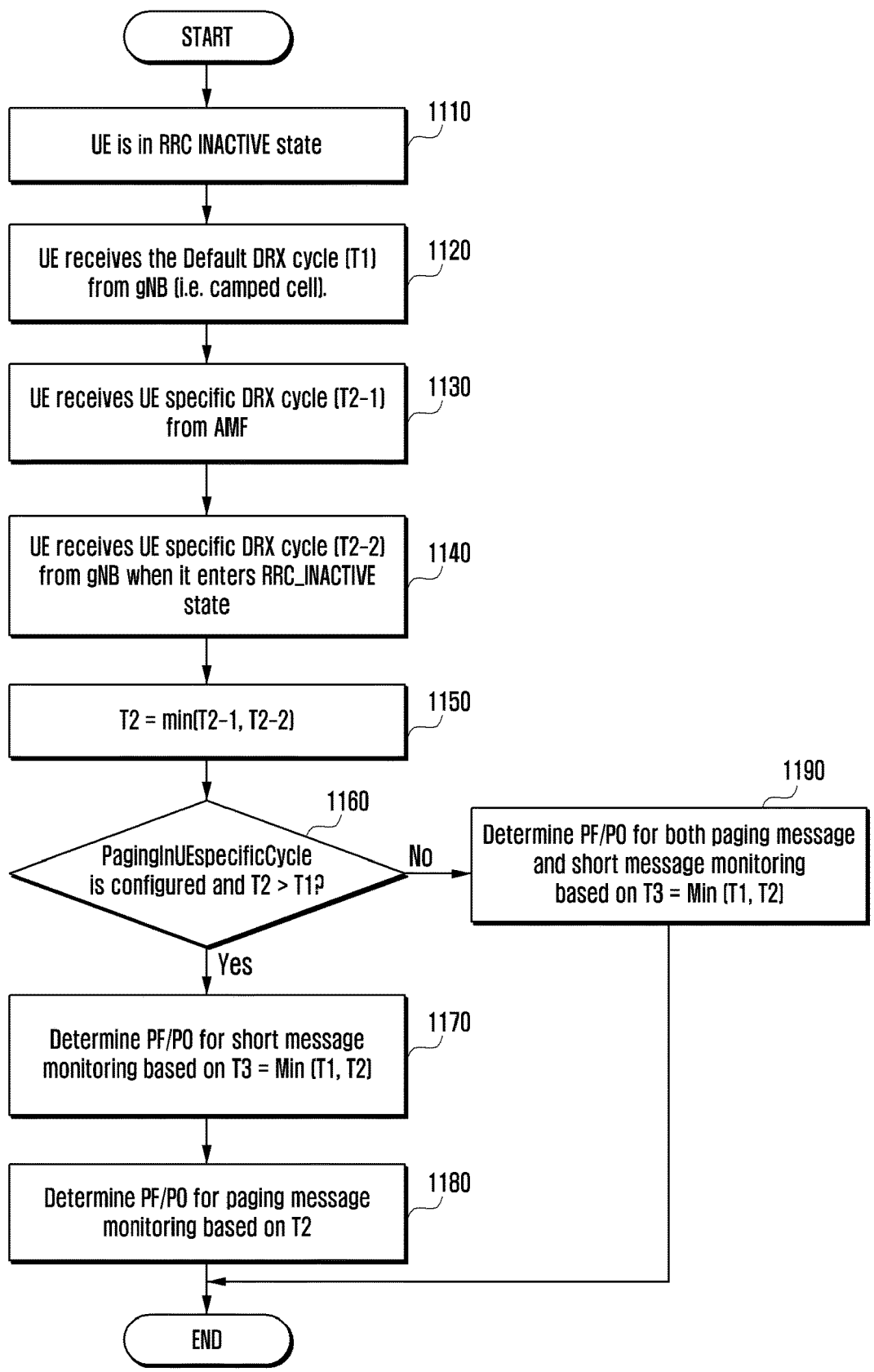
FIG. 11 illustrates a UE operation according to an embodiment based on Method 4 according to an embodiment of the disclosure.

Method 4:

FIG. 11 illustrates a UE operation based on Method 4 according to an embodiment of the disclosure.

Referring to FIG. 11, the UE is in an RRC_INACTIVE state at operation 1110.

The UE receives the default DRX cycle (T1) from the gNB (i.e., the camped cell) at operation 1120. The default DRX cycle (T1) along with other parameters, i.e., N, Ns and PF_offset are received in a paging channel configuration. The paging channel configuration is received in the SI (e.g., SystemInformationBlock1) by the UE. The UE also receives paging search space configuration from the gNB. The paging search space configuration is received in the SI (e.g., SystemInformationBlock1) by the RRC_IDLE/RRC_INACTIVE UE.

The UE receives the UE specific DRX cycle (T2-1) from an upper layer at operation 1130. The upper layer receives the same from the AMF or negotiates the same with the AMF.

The UE receives the UE specific DRX cycle (T2-2) from the gNB when it enters the RRC_INACTIVE state at operation 1140.

The UE determines the UE specific DRX cycle T2=min (T2-1, T2-2) at operation 1150.

The UE determines whether PagingInUEspecificCycle is configured and the UE specific DRX cycle (T2) is greater than the default DRX cycle (T1) or not at operation 1160. PagingInUEspecificCycle is signaled by the gNB (i.e., camped cell). It can be signaled in the SI (e.g., SystemInformationBlock1). PagingInUEspecificCycle is a 1 bit indicator. It indicates that the UE should monitor PF/PO for paging based on the UE specific DRX cycle (T2). In an embodiment, if PagingInUEspecificCycle is received from the gNB, it is considered as configured. Otherwise not. In another embodiment, if PagingInUEspecificCycle set to TRUE is received from the gNB, it is considered as configured. Otherwise not. In an embodiment, parameter PagingInUEspecificCycle can be signaled in dedicated signaling for the RRC_INACTIVE UE; RRC_INACTIVE follows this parameter. In an embodiment, if PagingInUEspecificCycle is received both in dedicated signaling and in SI, PagingInUEspecificCycle is considered as configured, otherwise not. In an embodiment, if PagingInUEspecificCycle is set to TRUE in dedicated signaling and in system information, PagingInUEspecificCycle is considered as configured.

If PagingInUEspecificCycle is configured and the UE specific DRX cycle (T2) is greater than the default DRX cycle (T1), the UE determines the PF and the PO for short message monitoring based on DRX cycle (T3)=Min (default DRX cycle (T1), UE specific DRX cycle (T2)) at operation 1170. Specifically, the UE determines the DRX cycle (T3), where T3=Min (default DRX cycle (T1), UE specific DRX cycle (T2)). The UE determines the PF, where the PF is the SFN which satisfies (SFN+PF_offset) mod T3=(T3 div N)*(UE_ID mod N). The UE determines its PO corresponding to the determined PF as explained earlier. In the determined PO, the UE monitors the PDCCH addressed to the P-RNTI for the short message. If the DCI addressed to the P-RNTI includes the short message, the UE processes the received short message. Alternately, for the short message monitoring, the UE determines the DRX cycle (T4), where T4=modification period. The modification period is signaled by the gNB in the SIB1. The UE determines the PF, where the PF is the SFN which satisfies (SFN+PF_offset) mod T4=(T4 div N)*(UE_ID mod N). The UE determines its PO corresponding to the determined PF as explained earlier. In the determined PO, the UE monitors the PDCCH addressed to the P-RNTI for the short message. If the DCI addressed to the P-RNTI includes the short message, the UE processes the received short message.

The UE determines the PF and the PO for paging message monitoring based on the UE specific DRX cycle (T2) at operation 1180. Specifically, the UE determines the PF, where the PF is the SFN which satisfies (SFN+PF_offset) mod T2=(T2 div N)*(UE_ID mod N). The UE determines its PO corresponding to the determined PF as explained earlier. In the determined PO, the UE monitors the PDCCH addressed to the P-RNTI for the paging message. If the DCI addressed to the P-RNTI includes the scheduling information for the paging message, the UE decodes the DL TB based on the received scheduling information. In the paging message received in the decoded DL TB, the UE checks for its paging identity (e.g., S-TMSI, I-RNTI). If the paging message is there for the UE, the gNB includes scheduling information for the paging message in the DCI, where the DCI is transmitted in PO as determined above.

Else (i.e., if the UE specific DRX cycle (T2) is not greater than default DRX cycle (T1) or PagingInUEspecificCycle is not configured), the UE determines the PF and the PO for both the paging message and the short message monitoring based on DRX cycle (T3)=Min (default DRX cycle (T1), UE specific DRX cycle (T2)) at operation 1190. Specifically, the UE determines DRX cycle (T3), where T3=Min (default DRX cycle (T1), UE specific DRX cycle (T2)). The UE determines the PF, where the PF is the SFN which satisfies (SFN+PF_offset) mod T3=(T3 div N)*(UE_ID mod N). The UE determines its PO corresponding to the determined PF as explained earlier. In the determined PO, the UE monitors the PDCCH addressed to the P-RNTI for the short message and the paging message. If the DCI addressed to the P-RNTI includes the scheduling information for the paging message, the UE decodes the DL TB based on received scheduling information. In the paging message received in the decoded DL TB, the UE checks for its paging identity (e.g., S-TMSI, I-RNTI). If the paging message is there for the UE, the gNB includes the scheduling information for the paging message in the DCI, where the DCI is transmitted in PO as determined above. Alternately, for short message monitoring, the UE determines the DRX cycle (T4), where T4=modification period. The modification period is signaled by the gNB in the SIB1. The UE determines the PF, where the PF is the SFN which satisfies (SFN+PF_offset) mod T4=(T4 div N)*(UE_ID mod N). The UE determines its PO corresponding to the determined PF as explained earlier. In the determined PO, the UE monitors the PDCCH addressed to the P-RNTI for the short message. If the DCI addressed to the P-RNTI includes the short message, the UE processes the received short message.

Figure 12:
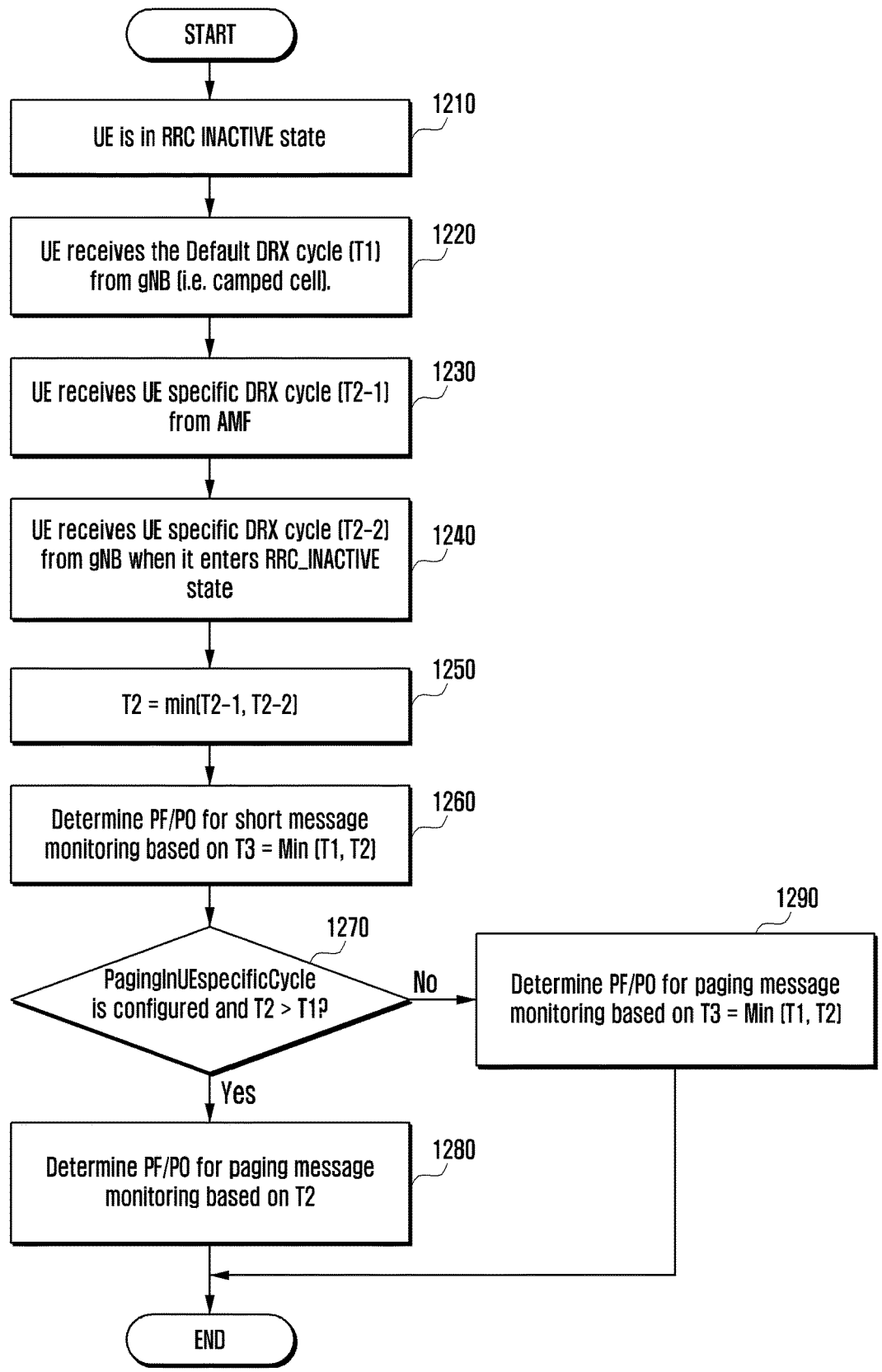
FIG. 12 illustrates a UE operation based on Method 4 according to an embodiment of the disclosure.

FIG. 12 illustrates a UE operation based on Method 4 according to an embodiment of the disclosure.

Referring to FIG. 12, the UE is in an RRC_INACTIVE state at operation 1210.

The UE receives the default DRX cycle (T1) from the gNB (i.e., the camped cell) at operation 1220. The default DRX cycle (T1) along with other parameters, i.e., N, Ns and PF_offset are received in paging channel configuration. The paging channel configuration is received in the SI (e.g., SystemInformationBlock1) by the UE. The UE also receives paging search space configuration from the gNB. The paging search space configuration is received in the SI (e.g., SystemInformationBlock1) by RRC_IDLE/RRC_INACTIVE UE.

The UE receives the UE specific DRX cycle (T2-1) from an upper layer at operation 1230. The upper layer receives the same from the AMF or negotiates the same with the AMF.

The UE receives the UE specific DRX cycle (T2-2) from the gNB when it enters the RRC_INACTIVE state at operation 1240.

The UE determines the UE specific DRX cycle T2=min (T2-1, T2-2) at operation 1250.

The UE determines the PF and the PO for short message monitoring based on DRX cycle (T3)=Min (default DRX cycle (T1), UE specific DRX cycle (T2)) at operation 1260. Specifically, the UE determines the DRX cycle (T3), where T3=Min (default DRX cycle (T1), UE specific DRX cycle (T2)). The UE determines the PF, where the PF is the SFN which satisfies (SFN+PF_offset) mod T3=(T3 div N)*

(UE_ID mod N). The UE determines its PO corresponding to the determined PF as explained earlier. In the determined PO, the UE monitors the PDCCH addressed to the P-RNTI for the short message. If the DCI addressed to the P-RNTI includes the short message, the UE processes the received short message. Alternately, for the short message monitoring, the UE determines the DRX cycle (T4), where T4=modification period. The modification period is signaled by the gNB in the SIB1. The UE determines the PF, where the PF is the SFN which satisfies (SFN+PF_offset) mod T4=(T4 div N)*(UE_ID mod N). The UE determines its PO corresponding to the determined PF as explained earlier. In the determined PO, the UE monitors the PDCCH addressed to the P-RNTI for the short message. If the DCI addressed to the P-RNTI includes the short message, the UE processes the received short message.

The UE determines whether PagingInUEspecificCycle is configured and the UE specific DRX cycle (T2) is greater than the default DRX cycle (T1) or not at operation 1270. PagingInUEspecificCycle is signaled by the gNB (i.e., the camped cell). It can be 1 signaled in the SI (e.g., SystemInformationBlock1). PagingInUEspecificCycle is a 1 bit indicator. It indicates that the UE should monitor PF/PO for paging based on the UE specific DRX cycle (T2). In an embodiment, if PagingInUEspecificCycle is received from the gNB, it is considered as configured. Otherwise not. In another embodiment, if PagingInUEspecificCycle set to TRUE is received from the gNB, it is considered as configured. Otherwise not. In an embodiment, parameter PagingInUEspecificCycle can be signaled in the dedicated signaling for the RRC_INACTIVE UE; RRC_INACTIVE follows this parameter. In an embodiment, if PagingInUEspecificCycle is received both in the dedicated signaling and in SI, PagingInUEspecificCycle is considered as configured, otherwise not. In an embodiment, if PagingInUEspecificCycle is set to TRUE in the dedicated signaling and in SI, PagingInUEspecificCycle is considered as configured.

If PagingInUEspecificCycle is configured and the UE specific DRX cycle (T2) is greater than the default DRX cycle (T1), the UE determines the PF and the PO for the paging message monitoring based on the UE specific DRX cycle (T2) at operation 1280. Specifically, the UE determines the PF, where the PF is the SFN which satisfies (SFN+PF_offset) mod T2=(T2 div N)*(UE_ID mod N). The UE determines its PO corresponding to the determined PF as explained earlier. In the determined PO, the UE monitors the PDCCH addressed to the P-RNTI for the paging message. If the DCI addressed to the P-RNTI includes the scheduling information for the paging message, the UE decodes the DL TB based on the received scheduling information. In the paging message received in the decoded DL TB, the UE checks for its paging identity (e.g., S-TMSI). If paging message is there for the UE, the gNB includes the scheduling information for the paging message in the DCI, where the DCI is transmitted in PO as determined above.

Else (i.e., if the UE specific DRX cycle (T2) is not greater than default DRX cycle (T1) or PagingInUEspecificCycle is not configured), the UE determines the PF and the PO for the paging message monitoring based on DRX cycle (T3)=Min (default DRX cycle (T1), UE specific DRX cycle (T2)) at operation 1290. Specifically, the UE determines DRX cycle (T3), where T3=Min (default DRX cycle (T1), UE specific DRX cycle (T2)). The UE determines the PF, where the PF is the SFN which satisfies (SFN+PF_offset) mod T3=(T3 div N)*(UE_ID mod N). The UE determines its PO corresponding to the determined PF as explained earlier. In the determined PO, the UE monitors the PDCCH addressed to the P-RNTI for the paging message. If the DCI addressed to the P-RNTI includes the scheduling information for the paging message, the UE decodes the DL TB based on received scheduling information. In the paging message received in decoded DL TB, the UE checks for its paging identity (e.g., S-TMSI, I-RNTI). If paging message is there for the UE, the gNB includes the scheduling information for the paging message in the DCI, where the DCI is transmitted in PO as determined above.

Figure 13:
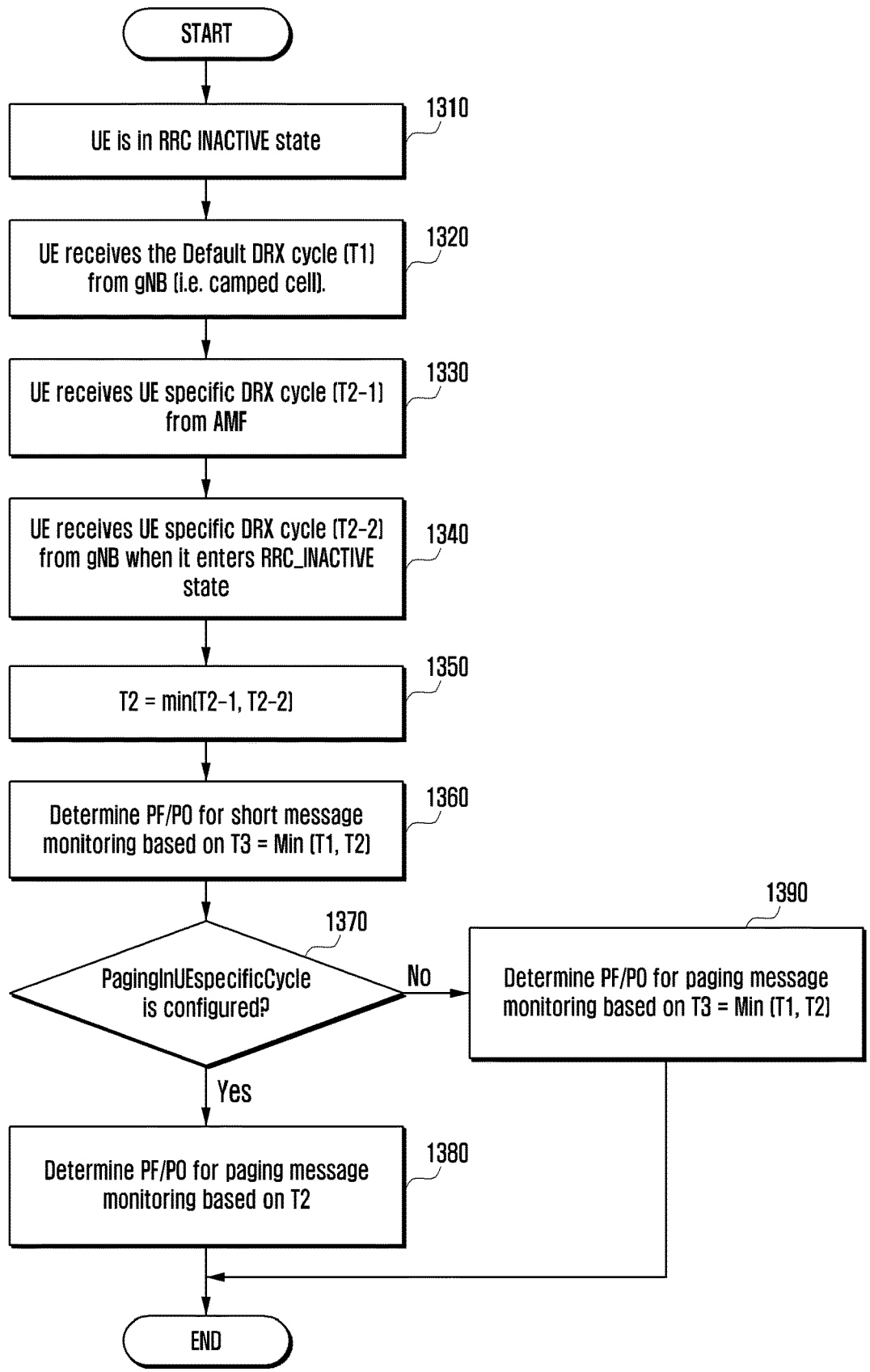
FIG. 13 illustrates a UE operation based on Method 4 according to an embodiment of the disclosure.

FIG. 13 illustrates a UE operation based on Method 4 according to an embodiment of the disclosure.

Referring to FIG. 13, the UE is in an RRC_INACTIVE state at operation 1310.

The UE receives the default DRX cycle (T1) from the gNB (i.e., camped cell) at operation 1320. The default DRX cycle (T1) along with other parameters, i.e., N, Ns and PF_offset are received in paging channel configuration. The paging channel configuration is received in the SI (e.g., SystemInformationBlock1) by the UE. The UE also receives paging search space configuration from the gNB. The paging search space configuration is received in the SI (e.g., SystemInformationBlock1) by RRC_IDLE/RRC_INACTIVE UE.

The UE receives the UE specific DRX cycle (T2-1) from an upper layer at operation 1330. The upper layer receives the same from AMF or negotiates the same with AMF.

The UE receives the UE specific DRX cycle (T2-2) from the gNB when it enters the RRC_INACTIVE state at operation 1340.

The UE determines UE specific DRX cycle T2=min (T2-1, T2-2) at operation 1350.

The UE determines the PF and the PO for short message monitoring and monitors the POs for the short message based on the DRX cycle (T3) at operation 1360, where T3=min (default DRX cycle (T1), UE specific DRX cycle (T2)). Specifically, the UE determines the PF, where the PF is the SFN which satisfies (SFN+PF_offset) mod T3=(T3 div N)*(UE_ID mod N). The UE determines its PO corresponding to the determined PF as explained earlier. In the determined PO, the UE monitors the PDCCH addressed to the P-RNTI for the short message. If the DCI addressed to the P-RNTI includes the short message, the UE processes the received short message. Alternately, for short message monitoring, the UE determines the DRX cycle (T4), where T4=modification period. The modification period is signaled by the gNB in the SIB1. The UE determines the PF, where the PF is the SFN which satisfies (SFN+PF_offset) mod T4=(T4 div N)*(UE_ID mod N). The UE determines its PO corresponding to the determined PF as explained earlier. In the determined PO, the UE monitors the PDCCH addressed to the P-RNTI for short message. If the DCI addressed to the P-RNTI includes the short message, the UE processes the received short message.

The UE determines whether PagingInUEspecificCycle is configured at operation 1370. PagingInUEspecificCycle is signaled by the gNB (i.e., camped cell). It can be signaled in SI (e.g., SystemInformationBlock1). PagingInUEspecificCycle is a 1 bit indicator. It indicates that the UE should monitor PF/PO for paging based on the UE specific DRX cycle (T2). In an embodiment, if PagingInUEspecificCycle is received from the gNB, it is considered as configured. Otherwise not. In another embodiment, if PagingInUEspecificCycle set to TRUE is received from the gNB, it is considered as configured. Otherwise not. In an embodiment, parameter PagingInUEspecificCycle can be signaled in the dedicated signaling for the RRC_INACTIVE UE;

RRC_INACTIVE follows this parameter. In an embodiment, if PagingInUEspecificCycle is received both in the dedicated signaling and in the SI, PagingInUEspecificCycle is considered as configured, otherwise not. In an embodiment, if PagingInUEspecificCycle is set to TRUE in the dedicated signaling and in SI, PagingInUEspecificCycle is considered as configured.

If PagingInUEspecificCycle is configured, the UE determines the PF and the PO for paging message monitoring and monitors the POs for the paging message based on the UE specific DRX cycle (T2) at operation 1380. Specifically, the UE determines the PF, where the PF is the SFN which satisfies (SFN+PF_offset) mod T2=(T2 div N)*(UE_ID mod N). The UE determines its PO corresponding to the determined PF as explained earlier. In the determined PO, the UE monitors the PDCCH addressed to the P-RNTI for the paging message. If the DCI addressed to the P-RNTI includes the scheduling information for the paging message, the UE decodes the DL TB based on the received scheduling information. In the paging message received in the decoded DL TB, the UE checks for its paging identity (e.g., S-TMSI, I-RNTI). If the paging message is there for the UE, the gNB includes the scheduling information for the paging message in the DCI, where the DCI is transmitted in PO as determined above.

Else (i.e., if PagingInUEspecificCycle is not configured), the UE determines the PF and the PO for paging message monitoring and monitors the POs for the paging message based on DRX cycle (T3)=min (default DRX cycle (T1), the UE specific DRX cycle (T2)) at operation 1390. Specifically, the UE determines the PF, where the PF is the SFN which satisfies (SFN+PF_offset) mod T3=(T3 div N)*(UE_ID mod N). The UE determines its PO corresponding to the determined PF as explained earlier. In the determined PO, the UE monitors the PDCCH addressed to the P-RNTI for the paging message. If the DCI addressed to the P-RNTI includes the scheduling information for the paging message, the UE decodes the DL TB based on received scheduling information. In the paging message received in decoded DL TB, the UE checks for its paging identity (e.g., S-TMSI, I-RNTI). If the paging message is there for the UE, the gNB includes the scheduling information for the paging message in the DCI, where the DCI is transmitted in PO as determined above.

It is to be noted that a BS also determines a PF and a PO for paging message transmission to a UE in same manner as determined by the UE (explained in embodiments). The UE specific DRX cycle (T2-1) is sent to the BS by an AMF.

In an embodiment, a UE may indicate to a network (e.g., a gNB) whether it prefers to monitor a paging message according to a UE specific paging cycle. The indication can be sent in a UE capability information message. An AMF can indicate this UE capability to a gNB along with a paging message to the gNB. If indicated, the gNB also determines a PF and a PO for paging message transmission to the UE in same manner as determined by the UE (explained in embodiments).

Short Message Monitoring Enhancement

The SI update notifications and emergency notifications are sent by the gNB using short message. For short message monitoring, the UE determines the DRX cycle (T3), where T3=Min (default DRX cycle, UE specific DRX cycle). The UE determines the PF where the PF is the SFN which satisfies (SFN+PF_offset) mod T3=(T3 div N)*(UE_ID mod N). The UE determines its PO corresponding to the determined PF as explained earlier. In the determined PO, the UE monitors the PDCCH addressed to the P-RNTI for the short message. If the DCI addressed to the P-RNTI includes the short message, the UE processes the received short message.

Figure 14:
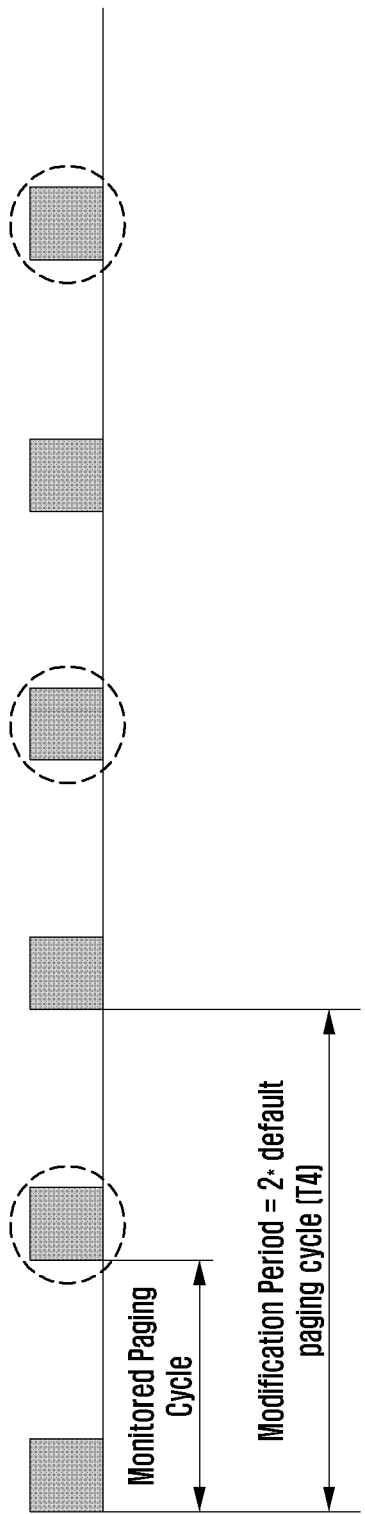
FIG. 14 illustrates an example where a monitored discontinuous reception (DRX) cycle is shorter than modification period according to an embodiment of the disclosure.

FIG. 14 illustrates an example where a monitored DRX cycle is shorter than modification period according to an embodiment of the disclosure.

Referring to FIG. 14, in case the monitored DRX cycle is shorter than a modification period, the UE unnecessary monitors certain POs for the short message. Short message monitoring in circled PFs is unnecessary.

In an embodiment for short message monitoring, the UE determines the DRX cycle (T4), where T4=modification period. The modification period is signaled by gNB in SIB1. The UE determines the PF where the PF is the SFN which satisfies (SFN+PF_offset) mod T4=(T4 div N)*(UE_ID mod N). The UE determines its PO corresponding to the determined PF as explained earlier. In the determined PO, the UE monitors the PDCCH addressed to the P-RNTI for the short message. If the DCI addressed to the P-RNTI includes the short message, the UE processes the received short message.

Figure 15:
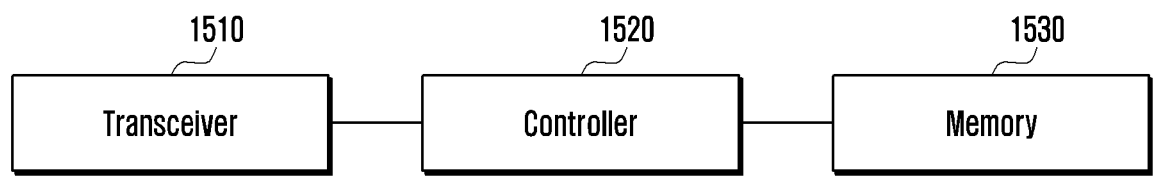
FIG. 15 is a block diagram of a terminal according to an embodiment of the disclosure.

FIG. 15 is a block diagram of a terminal according to an embodiment of the disclosure.

Referring to FIG. 15, a terminal includes a transceiver 1510, a controller 1520 and a memory 1530. The controller 1520 may refer to a circuitry, an application-specific integrated circuit (ASIC), a field programmable gate array (FPGA), or at least one processor. The transceiver 1510, the controller 1520, and the memory 1530 are configured to perform the operations of the UE illustrated elsewhere in the figures, e.g., FIGS. 1 to 14, or as otherwise described above. Although the transceiver 1510, the controller 1520, and the memory 1530 are shown as separate entities, they may be integrated onto a single chip. The transceiver 1510, the controller 1520, and the memory 1530 may also be electrically connected to or coupled with each other.

The transceiver 1510 may transmit and receive signals to and from other network entities, e.g., a base station or another terminal.

The controller 1520 may control the UE to perform functions according to the embodiments described above. For example, the controller 1520 is configured to control the transceiver 1510 to receive information on a default DRX cycle (T1) in SI from a base station.

The controller 1520 is configured to identify a UE specific DRX cycle (T2). The controller 1520 may be configured to control the transceiver 1510 to receive information on the UE specific DRX cycle (T2) from an AMF in case that the UE is in an RRC idle state. The controller 1520 may be configured to control the transceiver 1510 to receive information on a first UE specific DRX cycle (T2-1) from an AMF and information on a second UE specific DRX cycle (T2-2) from the base station when the UE enters a radio resource control (RRC) inactive state. The controller 1520 may be configured to identify the UE specific DRX cycle (T2) based on a minimum of the first UE specific DRX cycle (T2-1) and the second UE specific DRX cycle (T2-2).

The controller 1520 is configured to identify whether PagingInUEspecificCycle is configured and the UE specific DRX cycle (T2) is greater than the default DRX cycle (T1). The controller 1520 may be configured to identify a first PF and a first PO corresponding to the first PF based on the UE specific DRX cycle (T2) to monitor a paging message in case that the PagingInUEspecificCycle is configured and the UE specific DRX cycle (T2) is greater than the default DRX cycle (T1). The controller 1520 may be configured to identify a second PF and a second PO corresponding to the second PF based on a minimum of the default DRX cycle (T1) and the UE specific DRX cycle (T2) to monitor a short message in case that the PagingInUEspecificCycle is configured and the UE specific DRX cycle (T2) is greater than the default DRX cycle (T1). The controller 1520 may be configured to identify a third PF and a third PO corresponding to the third PF based on a minimum of the default DRX cycle (T1) and the UE specific DRX cycle (T2) to monitor a short message and a paging message in case that the PagingInUEspecificCycle is not configured or the UE specific DRX cycle (T2) is not greater than the default DRX cycle (T1).

In an embodiment, the operations of the terminal may be implemented using the memory 1530 storing corresponding program codes. Specifically, the terminal may be equipped with the memory 1530 to store program codes implementing desired operations. To perform the desired operations, the controller 1520 may read and execute the program codes stored in the memory 1530 by using a processor or a central processing unit (CPU).

Figure 16:
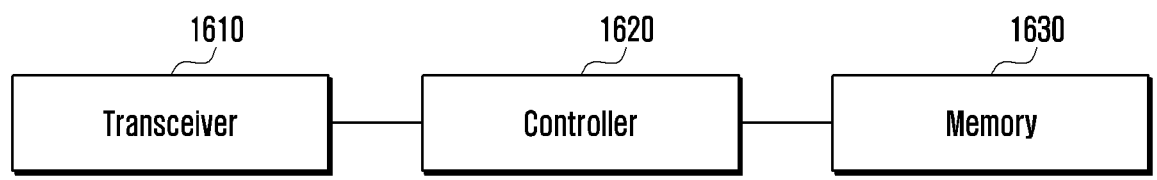
FIG. 16 is a block diagram of a base station according to an embodiment of the disclosure.

FIG. 16 is a block diagram of a base station according to an embodiment of the disclosure.

Referring to FIG. 16, a base station includes a transceiver 1610, a controller 1620, and a memory 1630. The controller 1620 may refer to a circuitry, an ASIC, an FPGA, or at least one processor. The transceiver 1610, the controller 1620, and the memory 1630 are configured to perform the operations of the gNB illustrated elsewhere in the figures, or as otherwise described above. Although the transceiver 1610, the controller 1620, and the memory 1630 are shown as separate entities, they may be integrated onto a single chip. The transceiver 1610, the controller 1620, and the memory 1630 may also be electrically connected to or coupled with each other.

The transceiver 1610 may transmit and receive signals to and from other network entities, e.g., a terminal.

The controller 1620 may control the gNB to perform functions according to the embodiments described above. For example, the controller 1620 is configured to control the transceiver 1610 to transmit information on a default DRX cycle (T1) to a UE and receive information on a UE specific DRX cycle (T2) from an AMF.

The controller 1620 is configured to identify whether PagingInUEspecificCycle is configured and the UE specific DRX cycle (T2) is greater than the default DRX cycle (T1). The controller 1620 may be configured to identify a first PF and a first PO corresponding to the first PF based on the UE specific DRX cycle (T2) to transmit a paging message in case that the PagingInUEspecificCycle is configured and the UE specific DRX cycle (T2) is greater than the default DRX cycle (T1). The controller 1620 may be configured to identify a second PF and a second PO corresponding to the second PF based on a minimum of the default DRX cycle (T1) and the UE specific DRX cycle (T2) to transmit a short message in case that the PagingInUEspecificCycle is configured and the UE specific DRX cycle (T2) is greater than the default DRX cycle (T1). The controller 1620 may be configured to identify a third PF and a third PO corresponding to the third PF based on a minimum of the default DRX cycle (T1) and the UE specific DRX cycle (T2) to transmit a short message and a paging message in case that the PagingInUEspecificCycle is not configured or the UE specific DRX cycle (T2) is not greater than the default DRX cycle (T1).

The controller 1620 is configured to control the transceiver 1610 to transmit a short message and/or a paging message to the UE on a PDCCH addressed to a P-RNTI in the identified PO(s).

In an embodiment, the operations of the base station may be implemented using the memory 1630 storing corresponding program codes. Specifically, the base station may be equipped with the memory 1630 to store program codes implementing desired operations. To perform the desired operations, the controller 1620 may read and execute the program codes stored in the memory 1630 by using a processor or a CPU.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a user equipment (UE) in a wireless communication system, the method comprising:
    receiving, from a base station, information on a default discontinuous reception (DRX) cycle;
    identifying a UE specific DRX cycle;
    in case that an indicator indicating that the UE monitors a paging occasion (PO) based on the UE specific DRX cycle is configured and
    the UE specific DRX cycle is greater than the default DRX cycle:
        identifying a first paging frame (PF) for monitoring a paging message based on the UE specific DRX cycle, and
        identifying a second PF for monitoring a short message based on a minimum of the UE specific DRX cycle and the default DRX cycle:
    monitoring a physical downlink control channel (PDCCH) addressed to a paging-radio network temporary identity (P-RNTI) in a first PO corresponding to the first PF; and
    monitoring the PDCCH addressed to the P-RNTI in a second PO corresponding to the second PF.

2. The method of claim 1, wherein the information on the default DRX cycle is included in a system information block.

3. The method of claim 1, further comprising:
    identifying a third PF for monitoring the short message and the paging message based on a minimum of the default DRX cycle and the UE specific DRX cycle in case that the indicator is not configured or the UE specific DRX cycle is not greater than the default DRX cycle; and
    monitoring the PDCCH addressed to the P-RNTI in a third PO corresponding to the third PF.

4. The method of claim 1, wherein the identifying the UE specific DRX cycle comprises:
    in case that the UE is in a radio resource control (RRC) idle state, receiving information on the UE specific DRX cycle from an access and mobility management function (AMF).

5. The method of claim 1, wherein the identifying the UE specific DRX cycle comprises:
    receiving information on a first UE specific DRX cycle from an access and mobility management function (AMF);
    receiving information on a second UE specific DRX cycle from the base station in case that the UE enters a radio resource control (RRC) inactive state; and
    identifying the UE specific DRX cycle based on a minimum of the first UE specific DRX cycle and the second UE specific DRX cycle.

6. A method performed by a base station in a wireless communication system, the method comprising:
   transmitting, to a user equipment (UE), information on a default discontinuous reception (DRX) cycle;
   receiving, from an access and mobility management function (AMF), information on a UE specific DRX cycle;
   in case that an indicator indicating that the UE monitors a paging occasion (PO) based on the UE specific DRX cycle is configured and
   the UE specific DRX cycle is greater than the default DRX cycles:
      identifying a first paging frame (PF) for monitoring a paging message based on the UE specific DRX cycle, and
      identifying a second PF for monitoring a short message based on a minimum of the UE specific DRX cycle and the default DRX cycle;
   transmitting, to the UE, the short message on a physical downlink control channel (PDCCH) addressed to a paging-radio network temporary identity (P-RNTI) in a first PO corresponding to the first PF; and
   transmitting, to the UE, the paging message on the PDCCH addressed to the P-RNTI in a second PO corresponding to the second PF.

7. The method of claim 6, wherein the information on the default DRX cycle is included in a system information block.

8. The method of claim 6, further comprising:
   identifying a third PF for transmitting the short message and the paging message based on a minimum of the default DRX cycle and the UE specific DRX cycle in case that the indicator is not configured or the UE specific DRX cycle is not greater than the default DRX cycle; and
   transmitting, to the UE, the short message and the paging message on the PDCCH addressed to the P-RNTI in a third PO corresponding to the third PF.

9. A user equipment (UE) in a wireless communication system, the UE comprising:
   a transceiver; and
   at least one processor coupled with the transceiver and configured to:
      receive, from a base station via the transceiver, information on a default discontinuous reception (DRX) cycle,
      identify a UE specific DRX cycle,
      in case that an indicator indicating that the UE monitors a paging occasion (PO) based on the UE specific DRX cycle is configured and
      the UE specific DRX cycle is greater than the default DRX cycle:
         identify a first paging frame (PF) for monitoring a paging message based on the UE specific DRX cycle, and
         identify a second PF for monitoring a short message based on a minimum of the UE specific DRX cycle and the default DRX cycle,
      monitor a physical downlink control channel (PDCCH) addressed to a paging-radio network temporary identity (P-RNTI) in a first PO corresponding to the first PF, and
      monitor the PDCCH addressed to the P-RNTI in a second PO corresponding to the second PF.

10. The UE of claim 9, wherein the information on the default DRX cycle is included in a system information block.

11. The UE of claim 9, wherein the at least one processor is further configured to:
   identify a third PF for monitoring the short message and the paging message based on a minimum of the default DRX cycle and the UE specific DRX cycle in case that the indicator is not configured or the UE specific DRX cycle is not greater than the default DRX cycle, and
   monitor the PDCCH addressed to the P-RNTI in a third PO corresponding to the third PF.

12. The UE of claim 9, wherein the at least one processor is further configured to receive, from an access and mobility management function (AMF) via the transceiver, information on the UE specific DRX cycle in case that the UE is in a radio resource control (RRC) idle state.

13. The UE of claim 9, wherein the at least one processor is further configured to:
   receive, from an access and mobility management function (AMF) via the transceiver, information on a first UE specific DRX cycle,
   receive, from the base station via the transceiver, information on a second UE specific DRX cycle in case that the UE enters a radio resource control (RRC) inactive state, and
   identify the UE specific DRX cycle based on a minimum of the first UE specific DRX cycle and the second UE specific DRX cycle.

14. A base station in a wireless communication system, the base station comprising:
   a transceiver; and
   at least one processor coupled with the transceiver and configured to:
      transmit, to a user equipment (UE) via the transceiver, information on a default discontinuous reception (DRX) cycle,
      receive, from an access and mobility management function (AMF) via the transceiver, information on a UE specific DRX cycle,
      in case that an indicator indicating that the UE monitors a paging occasion (PO) based on the UE specific DRX cycle is configured, and
      the UE specific DRX cycle is greater than the default DRX cycle;
         identify a first paging frame (PF) for monitoring a paging message based on the UE specific DRX cycle, and
         identify a second PF for monitoring a short message based on a minimum of the UE specific DRX cycle and the default DRX cycle,
      transmit, to the UE via the transceiver, the short message on a physical downlink control channel (PDCCH) addressed to a paging-radio network temporary identity (P-RNTI) in a first PO corresponding to the first PF, and
      transmit, to the UE via the transceiver, the paging message on the PDCCH addressed to the P-RNTI in a second PO corresponding to the second PF.

15. The base station of claim 14, wherein the default DRX cycle is included in a system information block.

16. The base station of claim 14, wherein the at least one processor is further configured to:
   identify a third PF for transmitting the short message and the paging message based on a minimum of the default DRX cycle and the UE specific DRX cycle in case that the indicator is not configured or the UE specific DRX cycle is not greater than the default DRX cycle, and transmit, to the UE via the transceiver, the short message and the paging message on the PDCCH addressed to the P-RNTI in a third PO corresponding to the third PF.

\* \* \* \* \*